(12) United States Patent
Tokushima

(10) Patent No.: US 8,027,556 B2
(45) Date of Patent: Sep. 27, 2011

(54) WAVEGUIDE COUPLING STRUCTURE

(75) Inventor: Masatoshi Tokushima, Tokyo (JP)

(73) Assignee: NEC Corporation, Tokyo (JP)

( * ) Notice: Subject to any disclaimer, the term of this patent is extended or adjusted under 35 U.S.C. 154(b) by 631 days.

(21) Appl. No.: 12/159,498

(22) PCT Filed: Dec. 27, 2006

(86) PCT No.: PCT/JP2006/326105
§ 371 (c)(1),
(2), (4) Date: Jun. 27, 2008

(87) PCT Pub. No.: WO2007/074876
PCT Pub. Date: Jul. 5, 2007

(65) Prior Publication Data
US 2010/0226609 A1    Sep. 9, 2010

(30) Foreign Application Priority Data

Dec. 27, 2005 (JP) ................. 2005-376455

(51) Int. Cl.
*G02B 6/26* (2006.01)
(52) U.S. Cl. .......................... 385/39; 385/131
(58) Field of Classification Search ............ 385/39, 385/129–132; 359/332
See application file for complete search history.

(56) References Cited

U.S. PATENT DOCUMENTS

| | | | | |
|---|---|---|---|---|
| 6,134,369 A * | 10/2000 | Kurosawa | ................. | 385/132 |
| 6,795,621 B2 * | 9/2004 | Tokushima | ................. | 385/50 |
| 6,832,033 B2 * | 12/2004 | Prather et al. | ................. | 385/129 |
| 6,879,766 B2 * | 4/2005 | Tomaru | ................. | 385/129 |
| 7,072,547 B2 * | 7/2006 | Assefa et al. | ................. | 385/39 |
| 7,123,804 B2 * | 10/2006 | Baba et al. | ................. | 385/129 |
| 7,171,095 B2 * | 1/2007 | Sugita et al. | ................. | 385/129 |
| 7,269,310 B2 * | 9/2007 | Suzuki et al. | ................. | 385/15 |
| 7,283,716 B2 * | 10/2007 | Park et al. | ................. | 385/129 |
| 7,421,179 B1 * | 9/2008 | Jiang et al. | ................. | 385/129 |

(Continued)

FOREIGN PATENT DOCUMENTS

JP      2001-356229     12/2001

(Continued)

OTHER PUBLICATIONS

M. Tokushima, H. Yamada, Light Propagation in a Photonic-Crystal-Slab Line-Defect Waveguide, IEEE Journal of Quantum Electronics, vol. 38, No. 7, Jul. 2002 753.*

(Continued)

*Primary Examiner* — Charlie Peng
(74) *Attorney, Agent, or Firm* — Young & Thompson

(57) ABSTRACT

A coupling structure of waveguide including a line defect (LD) waveguide portion having an LD waveguide, an electromagnetic field distribution matching portion (EFDMP) connected between the LD waveguide portion and a first tapered portion, the first tapered portion connected with the EFDMP, and a thin line waveguide portion connected with the first tapered portion and having a thin line waveguide. The EFDMP has a matching portion LD as the LD of a columnar photonic crystal, and the matching portion LD is connected with the LD waveguide. The first tapered portion consists of a first thin wire core, and the first LD of a columnar photonic crystal arranged along at least one side of first thin line core. At least one of the first thin line core and the first LD is connected with the matching portion line defect. The thin line waveguide is connected with the first thin line core.

21 Claims, 10 Drawing Sheets

U.S. PATENT DOCUMENTS

| | | | |
|---|---|---|---|
| 7,580,594 B2 * | 8/2009 | Hoshi | 385/3 |
| 7,778,509 B2 * | 8/2010 | Gomyo et al. | 385/50 |
| 7,831,124 B2 * | 11/2010 | Kiyota et al. | 385/132 |
| 2003/0185532 A1 * | 10/2003 | Hosomi et al. | 385/129 |
| 2004/0076361 A1 * | 4/2004 | Wong et al. | 385/14 |

FOREIGN PATENT DOCUMENTS

| | | |
|---|---|---|
| JP | 2003-270458 | 9/2003 |
| JP | 2003-315572 | 11/2003 |
| JP | 2005-172933 | 6/2005 |
| JP | 2005-181950 | 7/2005 |
| WO | 2007/074876 A1 | 7/2007 |

OTHER PUBLICATIONS

Steven G. Johnson et al, Physical Review E 66, 066608 (2002), Adiabatic theorem and continuous coupled-mode theory for efficient taper transitions in photonic crystals, Dec. 18, 2002, pp. 066608-1-15.

Peter Bienstman et al., Taper structure for coupling into photonic crystal slab waveguides, J. Opt Soc.Am. B, vol. 20, No. 9, Sep. 2003, pp. 1817-1821.

Andreas Hakansson et al., High Efficiency Defect-Based Photonic-Crystal Tapers Designed by a Genetic Algorithm, Journal of Lightwave Technology, vol. 23, No. 11 Nov. 2005, pp. 3881-2888.

Yuan-fong Chau et al., Coupling technique for efficient interfacing between silica waveguides and planner photonic crystal circuits, Applied Optics, vol. 43, No. 63, Dec. 20, 2004, pp. 6656-6663.

P. Sanchis et al., Semianalytic approach for analyzing coupling issue in photonic crystal structure, Applied Physics Letters, vol. 87, No. 20, Nov. 14, 2005, p. 203107-1 & p. 2013107-3.

International Search Report dated Jan. 29, 2007, in PCT application.

* cited by examiner

WAVEGUIDE COUPLING STRUCTURE

TECHNICAL FIELD

The present invention relates to a waveguide coupling structure, and more particularly relates to a waveguide coupling structure for coupling a line-defect waveguide in which light is guided along a line defect of a pillar photonic crystal and a wire waveguide in which a light is guided along a thin wire.

BACKGROUND ART

A technique is desired, which can attain an integrated circuit of optical elements, such as an integrated circuit of transistors. Under present circumstances, an optical circuit is produced such that individual elements, such as optical fibers serving as waveguides, discrete optical switches, wavelength filters and 3 dB couplers, are connected. However, if this optical circuit can be integrated in a small chip, the volume, electric power consumption and manufacturing cost of the circuit can be dramatically reduced.

Until now, many techniques have been developed for attaining the optical integrated circuit. Among those techniques, a technique of photonic crystal is remarked as the technique that can advance the higher function, smaller size and smaller electric power consumption of an optical device on a substrate at the digits between 100 and 100,000,000 times.

In a broad sense, the photonic crystal is the generic name of a structure in which a refractive index is periodically changed. The photonic crystal is typically used for electromagnetic wave. This name was given because this was originally devised for optical applications, and the periodic structure was analogous to crystals. The photonic crystal has various peculiar optical features because of the periodicity of its refractive index. The most representative feature lies in the possession of photonic band gaps (PBGs). When the periodic refractive index change of a photonic crystal is very large, light in a particular frequency band (or a wavelength band) cannot propagate through the photonic crystal. The diagram in which a longitudinal axis indicates the frequency of light, a lateral axis indicates the wave number of light, and the relation between the frequency and wave number of light propagating through the photonic crystal is plotted is referred to as a dispersion relation diagram or a photonic band diagram. In a photonic band diagram, frequency bands (or wavelength bands) in which such plots continuously exist and distribute as curves are referred to as bands. The gaps between those bands are referred to as photonic band gaps (PBGs) since the lights with the frequencies in the gaps cannot propagate through the photonic crystal.

When a micro defect that disturbs the periodicity of the refractive index distribution of a photonic crystal exists in the photonic crystal, lights having frequencies in PBGs are confined in the micro defect. In that case, since only lights having frequencies corresponding to the size of the defect are confined, the photonic crystal acts as a resonator of the lights and can be used as a frequency (wavelength) filter. When a line defect in which the micro defects are continuously formed in a line exists in the photonic crystal, even the lights having the frequencies in the PBGs can propagate along the line defect while confined in the line of the line defect. This indicates that the line defect of the photonic crystal carries out the role as a waveguide, and this is referred to as a line-defect waveguide. If a filter and a waveguide can be formed, optical modulators, optical switches and the like can be configured from only the waveguide or from a combination of the waveguide and the filter. In this way, when there is the photonic crystal, all of the main optical functional elements can be formed therein and connected, thereby enabling the configuration of optical circuits. Thus, the photonic crystal is expected as a platform of optical integrated circuits.

As a typical feature, the photonic crystal is useful as a platform of optical integrated circuits. From the viewpoint of manufacturing, the periodicity of the photonic crystal is desired to be two-dimensional. When the effect of the PBG is needed in the three directions of x, y and z which are perpendicular to one another, the photonic crystal must be three-dimensional. However, since the three-dimensional structure is complex, the manufacturing cost becomes expensive. So, a two-dimensional photonic crystal having a definite thickness is used, which has the two-dimensional periodicity inside a substrate plane and does not have periodicity in a thickness direction. In that case, the optical confinement in the thickness direction in a line-defect waveguide or a point-defect resonator is not caused by the effect of PBG, but caused by the mechanism of the total internal reflection due to the refractive index difference. The characteristics of the two-dimensional photonic crystal of the definite thickness do not perfectly coincide with those of the two-dimensional photonic crystal having an indefinite thickness. However, the optical characteristics substantially coincides with those of the two-dimensional photonic crystal having the indefinite thickness, if the refractive index distribution in the thickness direction of the two-dimensional photonic crystal having the definite thickness exhibits the reflection symmetry in the region through which light propagates. Predicting operation of a device composed of the two-dimensional photonic crystal having the indefinite thickness is very easy as compared with predicting operation of a device having a definite thickness. Thus, if the two-dimensional photonic crystal in which the refractive index distribution exhibits the reflection symmetry can be used, designing a device composed of the crystal will be easy. As specific structures which have been attained as two-dimensional photonic crystals having definite thicknesses, there are air-hole photonic crystal and pillar photonic crystal. Among them, in particular, line-defect waveguides of the latter crystal has useful propagation properties.

In a typical structure of the pillar photonic crystal of the definite thickness, cylindrical pillars that have a definite height and are made of high-dielectric-constant materials are arranged in a shape of square-lattice. In the square-lattice-of-cylindrical-pillar photonic crystal having the definite thickness as mentioned above, it is possible to form a waveguide in which light propagates along the line-defect-cylindrical pillars by making a cross section of a cylindrical pillar (referred to as a line-defect-cylindrical pillar) arranged in a certain line in the crystal, smaller than a cross section of a cylindrical pillar arranged around the certain line. In this waveguide, the line of the line-defect-cylindrical pillars corresponds to a core in a total-internal-reflection-confinement-type waveguide such as optical fibers and the like, and the cylindrical-pillar lattices distributed on both sides of the line of the line-defect-cylindrical pillars correspond to a cladding layer.

The feature of the line-defect waveguide lies in that a group velocity of guided light is small. Therefore, the line-defect waveguide can be used as an optical delay device. Also, because of the small group velocity, interaction time for the guided light and the crystal material becomes long. As a result, interaction effect becomes great even in a short waveguide. Thus, the line-defect waveguide can be also used as a waveguide in which a non-linear effect and the like can be efficiently used. On the other hand, depending on an application, there is a case where such characteristics are not appropriate. For example, when the line-defect waveguide is used as an optical interconnection to merely connect an optical delay device and a point defect resonator filter in an optical circuit, it is desired that the group velocity of the guided light is large. This is because the processing speed of the circuit can be high. Therefore, it is important to choose appropriate waveguides for different purposes of applications in the optical circuit. Hence, a technique is important, which can optically couple at a high efficiency the line-defect waveguide of the square-lattice-of-cylindrical-pillar photonic crystal that operate at the low group velocity and the wire waveguide that operates at the relatively high group velocity.

However, when both of the waveguides are simply butt-jointed to each other, highly efficient optical coupling cannot be obtained. This is because distribution of electromagnetic field intensity distributions and distributions of impedance (a ratio between an electric field and a magnetic field) of guided lights are greatly different between the guided lights in the two connected waveguides. Therefore, optical coupling structures for adiabatically connecting both of the waveguides, namely, the structure for gradually changing the waveguide structure from the structure of the line-defect waveguide to the structure of the wire waveguide have been devised. By adiabatically changing the waveguide structure, it is possible to gradually change the electromagnetic field distribution of the guided lights in a wide region and match the electromagnetic field impedances of the guided lights in the wide region in all of the portions of the optical coupling structure. Incidentally, the terms of "coupling" and "optical coupling" in this specification mean that optical electromagnetic field energy is transmitted from guided light of one waveguide to guided light of another waveguide. Also, the terms of "optical coupling structure" and "coupling structure" mean the structure for the optical coupling. On the other hand, the term "connection" is used to mean that the waveguides are merely structurally connected to each other.

An example of the optical coupling structure of a conventional waveguide is described below. FIG. 1 is a schematic diagram showing an example of the optical coupling structure of the waveguides disclosed in a document (Steven G. Johnson et al., Physical Review E, vol. 66, p. 066608). This drawing shows the cross section in the direction parallel to the substrate including the waveguide of light. An optical coupling structure 8 in FIG. 1 employs a configuration in which two taper portions (first taper portions 2) whose structures are adiabatically changed are combined. In this document, those two taper portions are shown in FIG. 8 and FIG. 9(b) of the document, respectively.

Incidentally, in this document, as a pillar of the pillar photonic crystal, a quadratic pillar 5 is used instead of the cylindrical pillar. The first taper portion 2 shown in FIG. 1 has the structure in which in a square-lattice-of-quadratic-pillar photonic crystal, lattices of quadratic pillars located, on both sides of a line of line-defect pillars (defect quadratic pillars 6) of a line-defect waveguide (line-defect waveguide portion 1) are gradually away from the line of the defect quadratic pillars 6. Also, a second taper portion 3 shown in FIG. 1 has a structure in which in the line of only the defect quadratic pillars that remains in the end of the first taper portion 2, a quadratic pillar interval is gradually narrowed and finally changed to a shape of a thin wire. FIG. 1 shows a structure in which the interval between gravity centers of the quadratic pillars is gradually narrowed, in order to make the quadratic pillar interval narrow in the second taper portion 3. On the other hand, FIG. 4 in this document shows a structure in which, instead of changing the gravity center interval between the quadratic pillars, a length in the waveguide direction, of the quadratic pillar is made gradually long and finally changed to the shape of the thin wire.

As a related technique, Japanese Laid-Open Patent Application (JP-P 2005-172933A) discloses a manufacturing method of a two-dimensional photonic crystal with a wire waveguide. This manufacturing method is a method of manufacturing the two-dimensional photonic crystal with the wire waveguide, which is composed of a two-dimensional photonic crystal having a waveguide and a wire waveguide connected to the waveguide, from a plate material in which a slab layer and a clad layer are laminated. The manufacturing method is characterized by having: (a) a vacancy forming step of forming an etching agent introducing vacancy in the slab layer; (b) an air bridge cavity forming step of introducing an etching agent through the etching agent introducing vacancy, and consequently etching a clad layer around the etching agent introducing vacancy to form a cavity in the clad layer; and (c) a step of forming a two-dimensional photonic crystal with a wire waveguide, in which vacancies are cyclically formed in the slab layer facing the cavity, then an in-crystal waveguide is formed from an outer edge of a region where the vacancies are formed to an inner side thereof to form the two-dimensional photonic crystal, and the slab layer is left by a predetermined width on the extension portion of the in-crystal waveguide from an outer edge of a region where the vacancies are formed to an outer side thereof, then the slab layer around it is removed to form the wire waveguide.

Also, Japanese Laid-Open Patent Application (JP-P 2003-315572A) discloses an optical waveguide and an optical element using it. This optical waveguide has a core portion and a clad portion having a photonic crystal member and may be configured such that a structure of the photonic crystal member is changed, and an effective refractive index of the clad portion is spatially changed, and a mode field diameter which is an electronic field magnitude distribution inside a plane vertical to an advancement direction of an optical waveguide mode is spatially changed. This may be configured such that a basic waveguide mode exists as the optical waveguide mode, and the mode field diameter of the basic waveguide mode is spatially changed.

Also, Japanese Laid-Open Patent Application (JP-P 2003-270458A) discloses a photonic crystal member and a photonic crystal waveguide. This photonic crystal waveguide is characterized in that in the photonic crystal member to propagate an electromagnetic wave, the photonic crystal waveguide is provided with a photonic crystal for a reflection protection of the electromagnetic wave. In the photonic crystal waveguide which propagates and guides the electromagnetic wave by using the photonic crystal member, this photonic crystal waveguide may be configured such that a region of a photonic crystal whose structure differs from the foregoing crystal member is provided on an input side or an output side of the electromagnetic wave in the crystal member, and an output magnitude from the crystal member is made large as compared with the case without the foregoing region.

The conventional coupling structure between the square-lattice-of-pillar photonic crystal line-defect waveguide and the wire waveguide has several problems. The first problem lies in the fact that it is difficult to obtain an optical coupling efficiency as designed in the conventional coupling structure of the waveguides, and thereby transmission characteristics and productivity are poor. This problem is caused by the fact that the portion difficult to be processed as designed exists in the coupling structure. This is because in the second taper portion 3 in FIG. 1, when the pillar interval becomes gradually narrow, the pillar interval becomes unlimitedly close to zero, immediately before reaching of the thin wire of the wire waveguide and exceeds a limit of a processing accuracy. In the second taper portion 3, to obtain a wide band and a high transmittance as much as possible, a rate at which the pillar intervals decrease is required to be as small as possible. However, as a result, the portion where the pillar interval is extremely narrow distributes over a long distance, and that portion cannot be well processed. Thus, the transmission efficiency will be worse on the contrary. The second problem lies in the fact that the length of the conventional coupling structure in the propagation direction of light will be long. In highly integrated optical circuits, it is desired that optical coupling structures in them are as small as possible. Hence, the long coupling structure can be a problem. This problem is caused by the fact that the coupling structure of the waveguides is configured by not one taper portion but a combination of two taper portions. In short, when periodicity of the crystal lattice portion of the pillar is changed in the coupling structure, this is not well operated, which disables the attainment of one taper structure that carries out functions of the first taper portion 2 and the second taper portion 3 at the same time.

DISCLOSURE OF INVENTION

An object of the present invention is to provide a coupling structure of waveguides, which improves productivity of the waveguide while keeping transmission characteristics of guided light. Also, another object of the present invention is to provide a coupling structure of waveguides that can be miniaturized by high integrating.

This and other objects, features and advantages of the present invention will be readily ascertained by referring to the following description and drawings.

In order to solve the above-mentioned problems, a coupling structure of waveguides of the present invention is a coupling structure of waveguides to couple a line-defect waveguide in which light is guided along a line defect of the pillar photonic crystal and a wire waveguide in which light is guided along a thin wire. This includes: a line-defect waveguide portion configured to include the line defect waveguide; an electromagnetic-field-distribution-matching portion configured to be connected between the line-defect waveguide portion and a first taper portion; the first taper portion configured to be connected to the electromagnetic-field-distribution-matching portion; and a wire waveguide portion configured to be connected to the first taper portion and include the wire waveguide. The electromagnetic-field-distribution-matching portion includes a matching portion line defect as a line defect of a pillar photonic crystal, and the matching portion line defect is connected to the line-defect waveguide. The first taper portion includes a first thin wire core and a first line defect of the pillar photonic crystal arranged along at least one side of the first thin wire core, and at least one of the first thin wire core and the first line defect is connected to the matching portion line defect. The wire waveguide is connected to the first thin wire core. Here, in order to distinguish the thin wire in the taper portion structure and the thin wire in the wire waveguide, the thin wire portion in the taper portion is referred to as "thin wire core".

The coupling structure of the waveguides further includes a second taper portion configured to be connected between the first taper portion and the wire waveguide portion. The second taper portion includes a second thin wire core and the pillar photonic crystal arranged along both sides of the second thin wire core, and the second thin wire core is connected to the first thin wire core. The wire waveguide is connected to the second thin wire core.

In order to solve the above-mentioned problems, a coupling structure of waveguides of the present invention is a coupling structure of waveguides to couple a line-defect waveguide in which light is guided along a line defect of a pillar photonic crystal and a wire waveguide in which light is guided along a thin wire. This includes: a line-defect waveguide portion configured to include a line defect waveguide; a first taper portion configured to be connected to the line-defect waveguide portion; a second taper portion configured to be connected between the first taper portion and a wire waveguide portion; and the wire waveguide portion configured to be connected to the first taper portion and include the wire waveguide. The first taper portion includes a first thin wire core and a first line defect of the pillar photonic crystal arranged along at least one side of the first thin wire core, and at least one of the first thin wire core and the first line defect is connected to the line-defect waveguide. The second taper portion includes a second thin wire core and the pillar photonic crystals arranged along both sides of the second thin wire core, and the second thin wire core is connected to the first thin wire core. The wire waveguide is connected to the second thin wire core.

In the coupling structure of the waveguides as mentioned above, the pillar photonic crystal is a square-lattice-of-pillar photonic crystal in which pillars made of high-refractive-index materials are arrayed in a shape of a square-lattice inside background medium made of a low-dielectric-constant material.

In the coupling structure of the waveguides, the line defect of the line-defect waveguide in the line-defect waveguide portion is configured such that a cross section of each of a plurality of pillars that forms at least one line in the pillar photonic crystal is set to a value different from a cross section of a pillar arranged adjacently to each of the plurality of pillars that forms at least one line.

In the coupling structure of the waveguides, the line defect of the line-defect waveguide in the line-defect waveguide portion is configured such that a cross section of each of a plurality of pillars that forms at least one line in the pillar photonic crystal is set to a value smaller than a cross section of a pillar arranged adjacently to each of the plurality of pillars that forms at least one line.

In the coupling structure of the waveguides, the electromagnetic-field-distribution-matching portion distributes electromagnetic field energy of light, which is guided from the line-defect waveguide in the line-defect waveguide portion, to the first thin wire core in the first taper portion and the first line defect of the pillar photonic crystal arranged along at least one side of the first thin wire core.

In the coupling structure of the waveguides, the matching portion line defect is arranged to connect the line defect of the line-defect waveguide in the line-defect waveguide portion, and the first thin wire core and the first line defect.

In the coupling structure of the waveguides, the matching portion line defect is arranged to connect the line defect of the line-defect waveguide in the line-defect waveguide portion and the first line defect.

In the coupling structure of the waveguides, the matching portion line defect has a T-branch shape with respect to the traveling direction of the guided light.

In the coupling structure of the waveguides, the matching portion line defect has a Y-branch shape with respect to a traveling direction of the guided light.

In the coupling structure of the waveguides, a cross section of each pillar composing the first line defect of the first taper portion is set to be gradually changed from a value smaller than a cross section of the adjacent pillar to a same value, as approaching from a connection end with the electromagnetic-field-distribution-matching portion toward a traveling direction of the guided light.

In the coupling structure of the waveguides, a width of the first thin wire core in the first taper portion is set such that a ratio of electromagnetic field energy distribution of the guided light, which distribute astraddle on each of the first thin wire core and the first line defect, include an appropriate value.

In the coupling structure of the waveguides, the pillar photonic crystal in the first taper portion is arranged at a position that is gradually away from the first thin wire core, as approaching from a connection end with the electromagnetic-field-distribution-matching portion toward a connection end with the wire waveguide portion.

In the coupling structure of the waveguides, the pillar photonic crystal in the second taper portion is arranged at a position that is gradually away from the second thin wire core, as approaching from a connection end with the first taper portion toward a connection end with the wire waveguide portion.

In the coupling structure of the waveguides, the pillar photonic crystal is a rectangular-lattice-of-pillar photonic crystal in which pillars made of high-refractive-index materials are arrayed in a shape of a rectangular lattice inside a background medium made of a low-dielectric-constant material.

In the coupling structure of the waveguides, the pillar photonic crystal is a triangular-lattice-of-pillar photonic crystal in which pillars made of high-refractive-index materials are arrayed in a shape of a triangular lattice inside a background medium made of a low-dielectric-constant material.

In the coupling structure of the waveguides, a pillar configuring the pillar photonic crystal has across section shape that is anyone of a circle, an ellipse and a polygon.

In the coupling structure of the waveguides, in a connection portion between the line-defect waveguide portion and the electromagnetic-field-distribution-matching portion, and in a connection portion between the electromagnetic-field-distribution-matching portion and the first taper portion, connections are made such that lattice intervals between the pillar photonic crystals are respectively equal.

In the coupling structure of the waveguides, in a connection portion between the line-defect waveguide portion and the electromagnetic-field-distribution-matching portion, in a connection portion between the electromagnetic-field-distribution-matching portion and the first taper portion, and in a connection portion between the first taper portion and the second taper portion, connections are made such that lattice intervals between the pillar photonic crystals are respectively equal.

In the coupling structure of the waveguides, in a connection portion between the line-defect waveguide portion and the first taper portion, and in a connection portion between the first taper portion and the second taper portion, connections are made such that lattice intervals between the pillar photonic crystals are respectively equal.

BEST MODE FOR CARRYING OUT THE INVENTION

First Exemplary Embodiment

Figure 2:
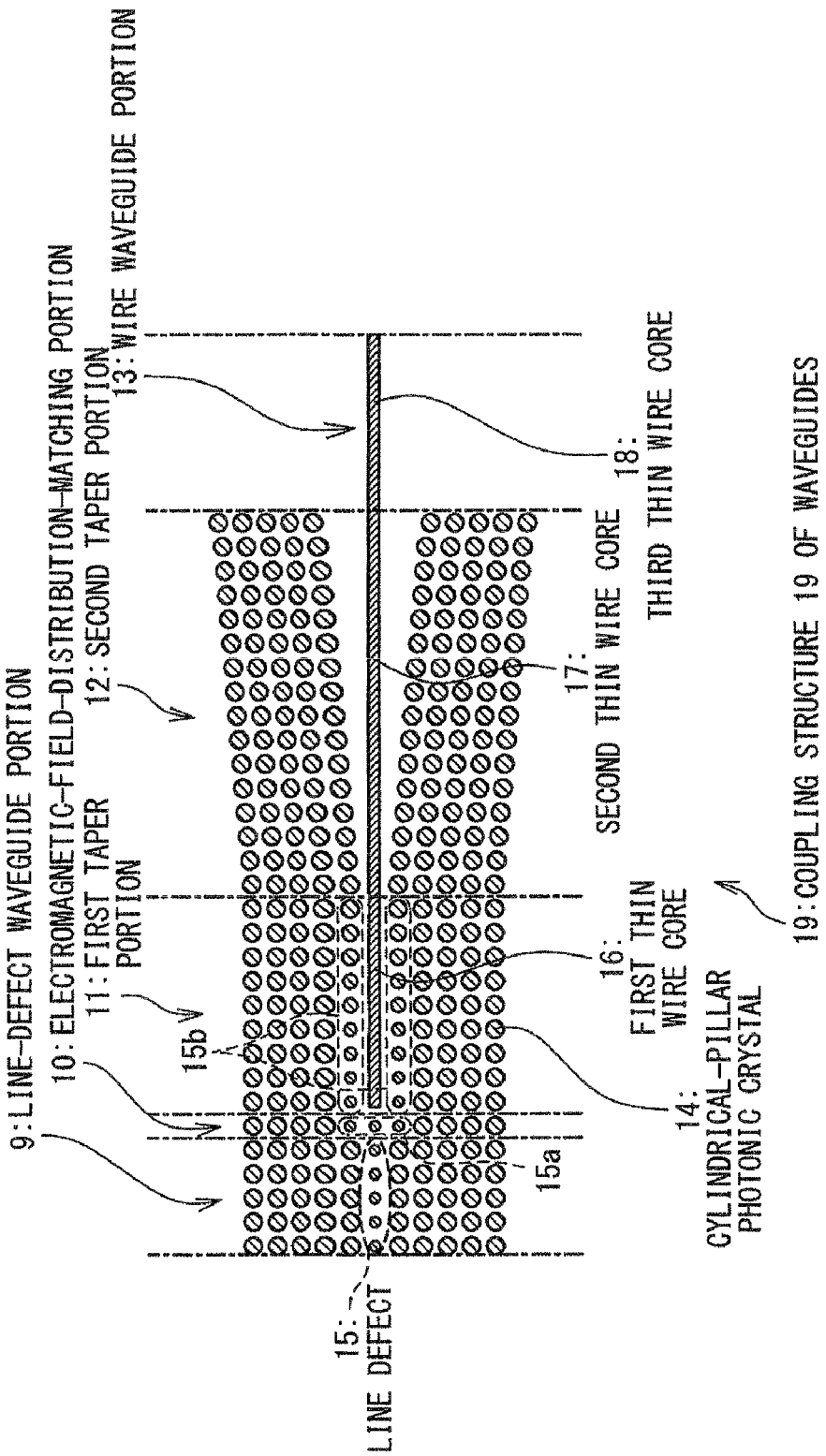
FIG. 2 is a view showing a coupling structure of photonic crystal waveguides according to a first exemplary embodiment of the present invention.

A coupling structure of waveguides according to a first exemplary embodiment of the present invention will be described below with reference to drawings. FIG. 2 shows a schematic structure of the coupling structure of the waveguides according to the first exemplary embodiment of the present invention. A coupling structure 19 of the waveguides of the present invention couples a line-defect waveguide in which light is guided along a line defect of a pillar photonic crystal and a wire waveguide in which light is guided along a thin wire. The coupling structure 19 of the waveguides includes a line-defect waveguide portion 9, an electromagnetic-field-distribution-matching portion 10, a first taper portion 11, a second taper portion 12 and a wire waveguide portion 13. The line-defect waveguide portion 9 includes the line-defect waveguide in which a line defect 15 is used as a core. The electromagnetic-field-distribution-matching portion 10 is connected to the line-defect waveguide portion 9. The first taper portion 11 is connected to the electromagnetic-field-distribution-matching portion 10. The second taper portion 12 is connected to the first taper portion 11. The wire waveguide portion 13 is connected to the second taper portion 12 and includes the wire waveguide, in which a third thin wire core 18 is used as the core.

The electromagnetic-field-distribution-matching portion 10 includes a line defect 15a of the pillar photonic crystal. The electromagnetic-field-distribution-matching portion 10 converts the distribution of electromagnetic field intensity and the distribution of electromagnetic impedance of the guided light at between the line-defect waveguide portion 9 and the first taper portion 11. The first taper portion 11 includes a first thin wire core 16 and a line defect 15b of a pillar photonic crystal 14 arranged along at least one side of the first thin wire core 16. The first taper portion 11 converts the energy distribution of the guided light in the first thin wire core 16 and the first line defect 15b, between the electromagnetic-field-distribution-matching portion 10 and the second taper portion 12. The second taper portion 12 includes a second thin wire core 17 and the pillar photonic crystals 14 arranged along both sides of the second thin wire core 17. The second taper portion 12 includes a function for transferring energy of the guided light to any one of the second thin wire core 17 and the pillar photonic crystal 14, between the first taper portion 11 and the wire waveguide portion 13.

The line-defect waveguide portion 9 includes a structure in which in a square-lattice-of-cylindrical-pillar photonic crystal where the cylindrical-pillars made of high-refractive-index materials are arrayed in the shape of a square-lattice inside a background medium made of low-dielectric-constant material, a cross section of each of cylindrical-pillars of one line is made smaller than a cross section of peripheral cylindrical-pillar. The cylindrical-pillars each having the cross section smaller than the cross section of the peripheral cylindrical-pillar correspond to defects when viewed from the peripheral pillar photonic crystal, and form a waveguide whose core is the line 15 of the defect cylindrical-pillars arrayed in a shape of line. Thus, it is referred to as a "line-defect waveguide". Light guided through the line-defect waveguide has a frequency within a photonic band gap of the photonic crystal. The light of the frequency within the photonic band gap is reflected by a perfect crystal based on an effect of the Bragg diffraction. Thus, the light cannot enter the perfect crystal portions on both sides of the line defect. Consequently, this is confined and guided in the line defect region.

The electromagnetic-field-distribution-matching portion 10 shown in FIG. 2 has a function for matching both of the distribution of the electromagnetic intensity and the distribution of the electromagnetic impedance, between the line-defect waveguide portion 9 and the first taper portion 11. In this exemplary embodiment, the length of the electromagnetic-field-distribution-matching portion 10 in the propagation direction (line direction) of the light in it is only one period (corresponding to one lattice interval in the line direction of the cylindrical-pillar photonic crystal), while generally it may have the length of one period or more. However, typically, when the length in the propagation direction of the light of the electromagnetic-field-distribution-matching portion 10 is short, the radiation loss of the propagation light is small, which leads to a high transmittance of the coupling structure of the waveguides. The inside structure of the electromagnetic-field-distribution-matching portion 10 is a structure in which the defect cylindrical-pillars (15a) where each cross section differs from that of the peripheral cylindrical-pillar are continuously distributed or discontinuously dotted, as mentioned above. The specific cross section and position depend on the structure of the coupled first taper portion 11. In particular, as shown in FIG. 2, when the structure of the end of the first taper portion 11, which is connected to the side of the line-defect waveguide portion 9, is the structure in which the cross section of the cylindrical-pillar in only one line placed on each side of the first thin wire core 16 is made smaller than the cross section of the peripheral cylindrical-pillar, the structure of the electromagnetic-field-distribution-matching portion 10 can have a simple and minimal structure in which three lines of the defect cylindrical-pillars having the small cross sections are continuously arrayed in the width direction, and its length is one period.

Most of the energy of the guided light propagating through the line-defect waveguide portion 9 distributes along the line defects 15 of one line composed of the defect cylindrical-pillars, and it only slightly penetrates through the lattices on both sides of the line defects 15. On the other hand, in the first taper portion 11, most of the energy of the guided light distributes along a total of three lines composed of the first thin wire core 16 and the line defects 15b on both sides of the first thin wire core 16. The action of the electromagnetic-field-distribution-matching portion 10 is to distribute the electromagnetic field energy of the light, which is guided along the line-defect waveguide including the line defects 15 of the line-defect waveguide portion 9, to the line-defect waveguide, which includes the first thin wire core 16 and the two line defects 15b on both sides thereof in the first taper portion 11, and then convert into the electromagnetic field of the guided light in the first taper portion 11 as a result and consequently supply the entire optical energy outputted from the line-defect waveguide portion 9 to the first taper portion 11.

In the respective connection portions of the line-defect waveguide portion 9, the electromagnetic-field-distribution-matching portion 10, the first taper portion 11, the second taper portion 12 and the wire waveguide portion 13 of the present invention, they are connected such that the lattice intervals in the line direction of the cylindrical-pillar photonic crystals are always constant to keep the periodicity of the photonic crystals. Also, in the first taper portion 11 and the second taper portion 12, the period in the line direction of the cylindrical-pillar photonic crystals arranged on both sides of the first thin wire core 16 and the second thin wire core 17 is any of a period which is constant anywhere, a period which varies gradually from being long at one side to being short at the other side (not shown), a period which varies gradually from being short at the one side to being long at the other side (not shown) and the combination thereof (not shown).

All of the electromagnetic-field-distribution-matching portion 10, the first taper portion 11, the second taper portion 12 and the wire waveguide portion 13 in the coupling structure 19 of the waveguide according to this exemplary embodiment operate for frequency bands including a transmission frequency band of the line-defect waveguide (for example: 9), and the light is transmitted in the wide band over the entire transmission frequency band of the line-defect waveguide. Also, the guided light on the line-defect waveguide side in the first taper portion 11 has an impedance close to that of the guided light of the wire waveguide (for example, 13) in the vicinity of the first thin wire core 16, and has an impedance close to that of the line-defect waveguide in the line-defect waveguide portion 9 in the defect cylindrical-pillar lines located on both sides of the first thin wire core 16 in which the cross sections differ from those of the periphery. That is, the electromagnetic field in the vicinity of the first thin wire core 16 in the first taper portion 11 has the characteristic of the electromagnetic field of the wire waveguide, and the electromagnetic field in the vicinity of the line defects 15b of the first taper portion 11 has the characteristic of the electromagnetic field of the line-defect waveguide.

The guided light input to the line-defect waveguide portion 9 is passed through the electromagnetic-field-distribution-matching portion 10 and input to the first thin wire core 16 in the first taper portion 11. The characteristic of the electromagnetic field of the line-defect waveguide portion 9 is different from that of the first thin wire core 16. The impedance mismatching between both of them causes the reflection of a part of the guided light input to the first thin wire core 16 in the first taper portion 11. The electromagnetic-field-distribution-matching portion 10 operates to re-input this reflected light to the lines of the defect cylindrical-pillars (for example, 15b) which are different in the cross section and arranged on both sides of the first thin wire core 16 in the first taper portion 11. In this way, the light re-input to the lines of the defect cylindrical-pillars which are different in the cross section and the light directly input from the line-defect waveguide portion 9 through the electromagnetic-field-distribution-matching portion 10 to the lines of the defect cylindrical-pillars which are different in the cross section in the first taper portion 11, are both input to the lines of the defect cylindrical-pillars, which are different in the cross section, without any reflection.

In this exemplary embodiment, as mentioned above, with the operation of the electromagnetic-field-distribution-matching portion 10, the guided light from the line-defect waveguide portion 9 is efficiently input to the first taper portion 11. The first taper portion 11 and the second taper portion 12 entirely have the thin wires (thin wire cores) (16, 17). On the operational principle, in order to transfer the guided light to the thin wire from the defect cylindrical-pillar line in which the cross sections are different, the cylindrical-pillar interval is not required to be unlimitedly close to zero. Similarly, the electromagnetic-field-distribution-matching portion 10 is not required to include the structure in which the cylindrical-pillar interval is extremely small. Hence, the entire coupling structure of the waveguides can be processed as designed.

(Operational Principle of First Exemplary Embodiment)

Here, the specific operation of the electromagnetic-field-distribution-matching portion 10 in the first exemplary embodiment is further described in detail. A part of the light with the width corresponding to one line of defect cylindrical-pillars, which is input to the electromagnetic-field-distribution-matching portion 10 from the line-defect waveguide portion 9, is input through the electromagnetic-field-distribution-matching portion 10 to the first thin wire core 16 in the first taper portion 11. Because of the difference in the structure between the defect cylindrical-pillars (15) and the thin wire core (16), the respective impedances are different. Thus, although a part of the light input from the line-defect waveguide portion 9 is transmitted into the first thin wire core 16, a part is reflected in the width direction (the direction vertical to the propagation direction of the light) along the defect cylindrical-pillars (for example, 15a) in the electromagnetic-field-distribution-matching portion 10. This reflected optical energy is combined with the light transmitted in the width direction along the defect cylindrical-pillars (15a) in the electromagnetic-field-distribution-matching portion 10 directly from the line-defect waveguide portion 9. The combined light is further converted by 90° into the direction of the first taper portion 11 at the position of the defect cylindrical-pillars on the second line from the center of the electromagnetic-field-distribution-matching portion 10, and input into the lines (15b) of the defect cylindrical-pillars, which are located on the both sides of the first thin wire core 16 of the first taper portion 11. The cross section of each of the cylindrical-pillars composing the defect cylindrical-pillar line (15b) in the first taper portion 11 is equal to or substantially equal to the cross section of the cylindrical-pillar (15a) of the electromagnetic-field-distribution-matching portion 10, at the position connected to the electromagnetic-field-distribution-matching portion 10. Thus, the electromagnetic impedances of the light passed through them are also equal to or substantially equal to that passed through the line-defect waveguide portion 9, and the impedance matching is satisfied with regard to the guided light input to the defect cylindrical-pillar lines (15b) in the first taper portion 11. As a result, the light outputted from the line-defect waveguide portion 9 passes through the electromagnetic-field-distribution-matching portion 10 so that all of the light energy is transmitted into the first taper portion 11. As for a cross section, the diameter of each of the three defect cylindrical-pillars (15a) in the electromagnetic-field-distribution-matching portion 10 shown in FIG. 2 is basically equal to that of each of the defect cylindrical-pillars (15) composing the line-defect waveguide in the line-defect waveguide portion 9. However, the fine adjustment on those cross sections is sometimes performed. The suitable ratio between the light intensities, which are distributed on the first thin wire core 16 in the first taper portion 11 and the defect cylindrical-pillar lines (15b) on both sides thereof, is determined on the basis of the structure itself. In order to adjust that the lights output from the line-defect waveguide 15 in the line-defect waveguide portion 9 are re-distributed inside the electromagnetic-field-distribution-matching portion 10 so as to satisfy the ratio, the respective cross sections of the defect cylindrical-pillars (15a) in the electromagnetic-field-distribution-matching portion 10 are fine-adjusted. Another method of setting the light intensity distribution ration appropriate is to adjust the width of the first thin wire core 16 in the first taper portion 11.

The first taper portion 11 shown in FIG. 2 has the structure in which the line defect of the line-defect waveguide composed of the square-lattice-of-cylindrical-pillar photonic crystal is replaced with the first thin wire core 16, and is further composed of the defect cylindrical-pillar lines (15b) where the cross sections of the cylindrical-pillars on both sides of the first thin wire core 16 are gradually enlarged from one end to the other end (in the case of FIG. 2, from the left to the right). Here, in order to distinguish the thin wire in the taper portion structure and the thin wire in the wire waveguide, the thin wire portion in the taper portion is referred to as "thin wire core". In FIG. 2, each of the cross sections of the defect cylindrical-pillars (15b) on the lines on both sides of the first thin wire core 16 are made smaller than the cross section of the peripheral cylindrical-pillar. Thus, in this portion, most of the electromagnetic field energy of the guided light is distributed astraddle on the three positions near the first thin wire core 16 and the defect cylindrical-pillars (15b) on both sides thereof. However, on the side connected to the second taper portion 12 in the first taper portion 11, the diameter of the defect cylindrical-pillar (15b) on each of both sides of the first thin wire core 16 equalizes to that of the peripheral cylindrical-pillar, and the electromagnetic field of the guided light cannot be almost distributed in the cylindrical-pillar portions on both sides of the first thin wire core 16. As a result, on the side connected to the second taper portion 12 in the first taper portion 11, the guided light is confined only in the vicinity of the first thin wire core 16. In this way, the role of the first taper portion 11 in FIG. 2 is to narrow the spread width of the electromagnetic field of the guided light, in such a way that the electromagnetic field energy of the guided light distributed astraddle on this first thin wire core 16 and the defect cylindrical-pillar lines (15b) arrayed on both sides thereof, is distributed only in the vicinity of the first thin wire core 16, as approaching the side connected to the second taper portion 12 in the first taper portion 11.

The second taper portion 12 shown in FIG. 2 has the structure in which the line defect of the line-defect waveguide composed of the square-lattice-of-cylindrical-pillar photonic crystal is replaced with the second thin wire core 17, and the whole of the cylindrical-pillar lattices on both sides of the second thin wire core 17 is gradually away from the second thin wire core 17, as approaching from one end to the other end (in the case of FIG. 2, from the left to the right). The side connected to the first taper portion 11 in the second taper portion 12 has the same structure as the side connected to the second taper portion 12 in the first taper portion 11, and the periods of the lattices connected are continuous at the interface. Thus, the guided light of the electromagnetic field structure same as the side connected to the second taper portion 12 in the first taper portion 11 is incident to the side connected to the first taper portion 11 in the second taper portion 12. That is, most of the electromagnetic field energy of the guided light is distributed in the vicinity of the second thin wire core 17, and the electromagnetic field of the guided light slightly penetrates into the cylindrical-pillar lattices on both sides of the second thin wire core 17. As for the light output from the first taper portion 11, since the electromagnetic field energy is already concentrated in the vicinity of the first thin wire core 16, even if the wire waveguide is directly connected to the first taper portion 11, a certain degree of the guided light is transmitted into the wire waveguide. However, the electromagnetic field energy that slightly penetrates into the cylindrical-pillar lattices on both sides of the first thin wire core 16 in the first taper portion 11 is not input to the wire waveguide, and the transmission efficiency is decreased correspondingly thereto. The second taper portion 12 has the function for converting the electromagnetic field energy of the light, which penetrate into the cylindrical-pillar lattices on both sides of the second thin wire core 17, into a part of the guided light of the second thin wire core 17. That is, as the cylindrical-pillar lattices on both sides of the second thin wire core 17 are gradually away from the second thin wire core 17, the electromagnetic field of the guided light which penetrates through in the cylindrical-pillar lattices is gradually pulled out to the second thin wire core 17 and converted into the part of the electromagnetic field energy of the guided light of the second thin wire core 17. As a result, the whole of the electromagnetic field of the guided light input to the second taper portion 12 from the first taper portion 11 is distributed in the vicinity of the second thin wire core 17. Moreover, its distribution of the electromagnetic field intensity and its distribution of the electromagnetic impedance become the same as those in the vicinity of the connection portion of the wire waveguide portion 13 connected to the other end of the second taper portion 12, respectively.

The third thin wire core 18 included in the wire waveguide portion 13 in FIG. 2 has the same refractive index and width as the second thin wire core 17. Thus, the electromagnetic field structure of the guided light input to the wire waveguide portion 13 from the second taper portion 12 coincides with that of the wire waveguide portion 13, and the entire energy of the light output from the second taper portion 12 is transmitted into the wire waveguide portion 13.

As mentioned above, in all of the portions between the line-defect waveguide portion 9, the electromagnetic-field-distribution-matching portion 10, the first taper portion 11, the second taper portion 12 and the wire waveguide portion 13, the electromagnetic field structure of the guided light, namely, the distribution of the electromagnetic field intensity and the distribution of the electromagnetic impedance are efficiently converted, and as a whole, they operate as a coupling structure of the waveguides whose transmission efficiency is high.

Although the coupling structure 19 of the waveguides in this exemplary embodiment includes the electromagnetic-field-distribution-matching portion 10, this portion has the function for matching the distribution of the electromagnetic field intensity and the distribution of the electromagnetic impedance between the different waveguides of the line-defect waveguide portion 9 and the first taper portion 11. A resonator structure in which a point defect and the like are used is known as a structure having a similar function. The electromagnetic-field-distribution-matching portion 10 in this exemplary embodiment and the resonator structure can be similar in structure. However, although the electromagnetic field energy is not accumulated in the electromagnetic-field-distribution-matching portion 10 in this exemplary embodiment, the electromagnetic field energy is accumulated in that portion in the resonator structure. Thus, both of them can be discriminated. When the resonator structure is used, only light at a resonation frequency can be transmitted through the resonator structure. Thus, there is a demerit that the transmission band is narrow, as the whole of the coupling structure of the waveguides including the resonator structure. On the other hand, the electromagnetic-field-distribution-matching portion 10 in this exemplary embodiment does not have the particular resonation frequency and operates for optically coupling the line-defect waveguide portion 9 and the first taper portion 11 at a high efficiency, in the wide band. Also, in the coupling structure 19 of the waveguides according to this exemplary embodiment, the first taper portion 11 and the second taper portion 12 do not have the particular resonant frequency. Hence, as the entire coupling structure of the waveguides, this is operated with the high transmittance in the wide band.

Figure 1:
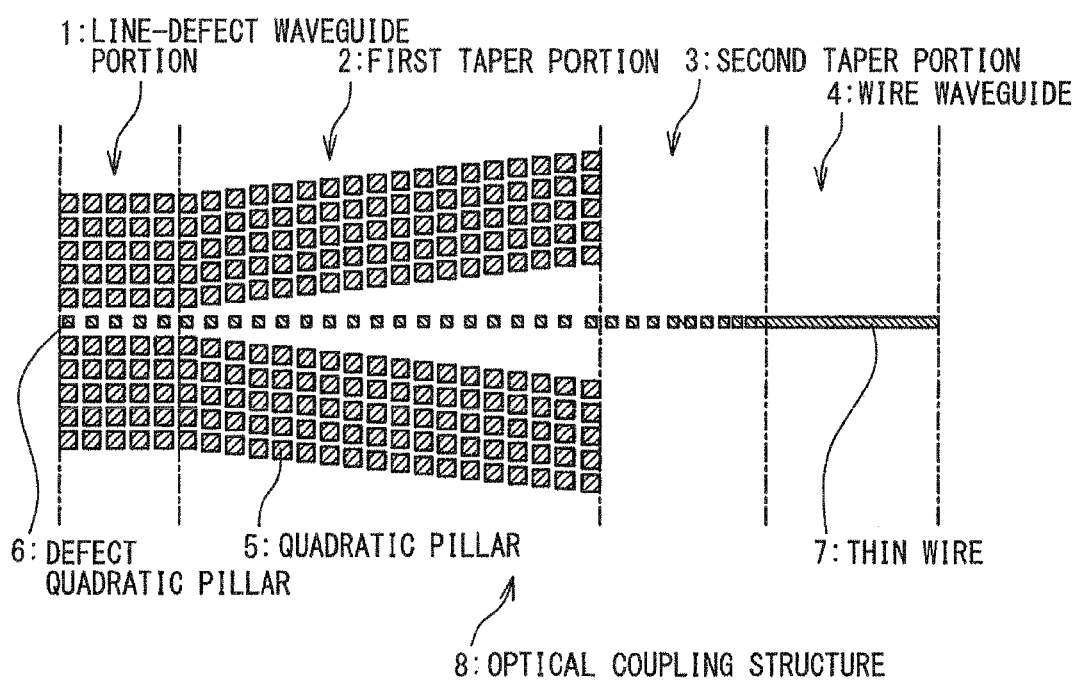
FIG. 1 is a view showing an optical coupling structure of the conventional photonic crystal waveguides.

The coupling structure 19 of the photonic crystal waveguides according to this exemplary embodiment operates with the high transmittance in the wide band similarly to the coupling structure 8 of the waveguides of the conventional taper type shown in FIG. 1. However, the coupling structure 19 of the photonic crystal waveguides in this exemplary embodiment has an excellent feature that the coupling structure 8 of the waveguides of the conventional taper type does not have. That is, the coupling structure 19 of the waveguides in this exemplary embodiment does not have the portion in which the period of the cylindrical-pillar lattice is excessively narrow, as an essential structure condition needed for the characteristic of the high transmittance in the wide band. As a result, the problem of the coupling structure 8 of the waveguides of the conventional taper type, in which the trial to obtain the characteristic of the high transmittance in the wide band results in the generation of the structure portion too fine to fabricate with the accuracy of the available processing technique, is solved by this exemplary embodiment.

(Manufacturing Method of First Exemplary Embodiment)

The manufacturing method of the coupling structure 19 of the waveguides according to the first exemplary embodiment of the present invention will be described below with reference to the drawings. FIG. 3A to FIG. 3E are the cross sectional views showing the respective steps, in relation to the manufacturing of the coupling structure 19 of the waveguides, according to the first exemplary embodiment of the present invention.

Figure 3A:
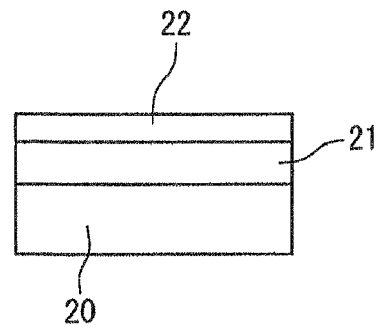
FIG. 3A is a view showing a manufacturing process of the coupling structure of the photonic crystal waveguides according to the first exemplary embodiment of the present invention.
Figure 3B:
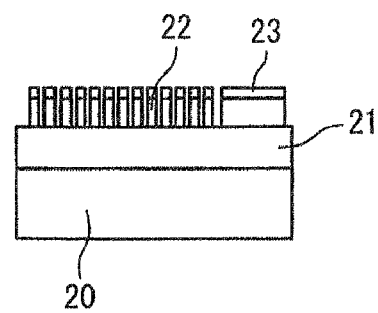
FIG. 3B is a view showing the manufacturing process of the coupling structure of the photonic crystal waveguides according to the first exemplary embodiment of the present invention.
Figure 3C:
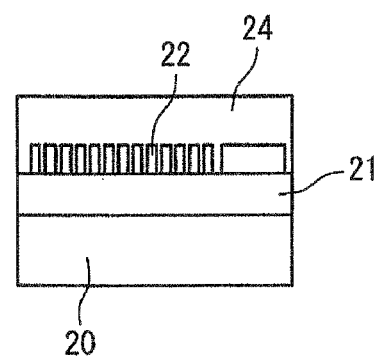
FIG. 3C is a view showing the manufacturing process of the coupling structure of the photonic crystal waveguides according to the first exemplary embodiment of the present invention.
Figure 3D:
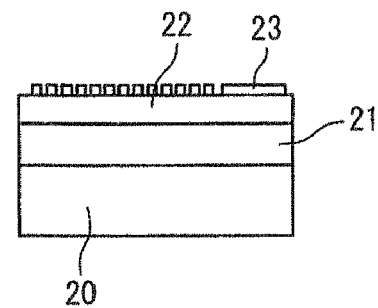
FIG. 3D is a view showing the manufacturing process of the coupling structure of the photonic crystal waveguides according to the first exemplary embodiment of the present invention.
Figure 3E:
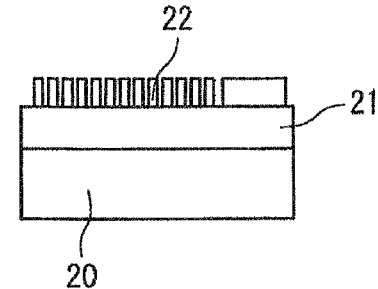
FIG. 3E is a view showing the manufacturing process of the coupling structure of the photonic crystal waveguides according to the first exemplary embodiment of the present invention.

At first, as shown in FIG. 3A, a thin film 21 made of a first low-refractive-index material serving as the background medium and a thin film 22 made of a high-refractive-index material thereon are sequentially laminated on a substrate 20. Next, as shown in FIG. 3B, a photo resist is coated, and the lithography technique, such as optical exposure, electron beam lithography and the like, is used to generate a photo resist pattern 23 having the pattern of the coupling structure of the waveguides. In succession, as shown in FIG. 3C, with the generated photo resist pattern 23 as a mask, a dry etching apparatus is used to vertically perform an anisotropic process on the thin film 22 made of the high-refractive-index material and consequently form the fine portions, such as the cylindrical-pillars, the thin wire cores and the like, which are made of the high-refractive-index materials. In succession, as shown in FIG. 3D, the photo resist pattern 23 used for the mask is removed with organic solvents. Finally, as shown in FIG. 3E, a thin film 24, which is made of a second low-refractive-index material which is equal to the first low-refractive-index material of the thin film 21, or whose refractive index is equal to the first low-refractive-index material of the thin film 21 and is different substance, is deposited or coated between the structures made of the high-refractive-index material and thereon. Consequently, the coupling structure of the waveguides is obtained.

In the first exemplary embodiment of the present invention, the high-refractive-index material is vertically processed. Also, the materials having the same refractive indexes are employed as the second low-refractive-index material and the first low-refractive-index material serving as the background medium. Thus, the refractive index distribution of the background medium in the vicinity of the high-refractive-index material where the guided light is confined becomes uniform. Thus, the coupling structure 19 of the waveguides according to this exemplary embodiment has the refractive index distribution that exhibits the reflection symmetry with respect to the central cross section in the thickness direction of the high-refractive-index material as a symmetric plane, in the thickness direction over the whole. Hence, in this exemplary embodiment, the transmission characteristic is obtained which substantially coincides with the transmission characteristic expected under an assumption as a two-dimensional structure in which the thicknesses of the high-refractive-index material and the background medium are infinite. This results in a merit that the design is easy. Moreover, the second low-refractive-index material, when having the same refractive index as the first low-refractive-index material, may be the different substance. Hence, this leads to a merit that a resin or the like in which coating is easy can be used.

Second Exemplary Embodiment

Figure 4:
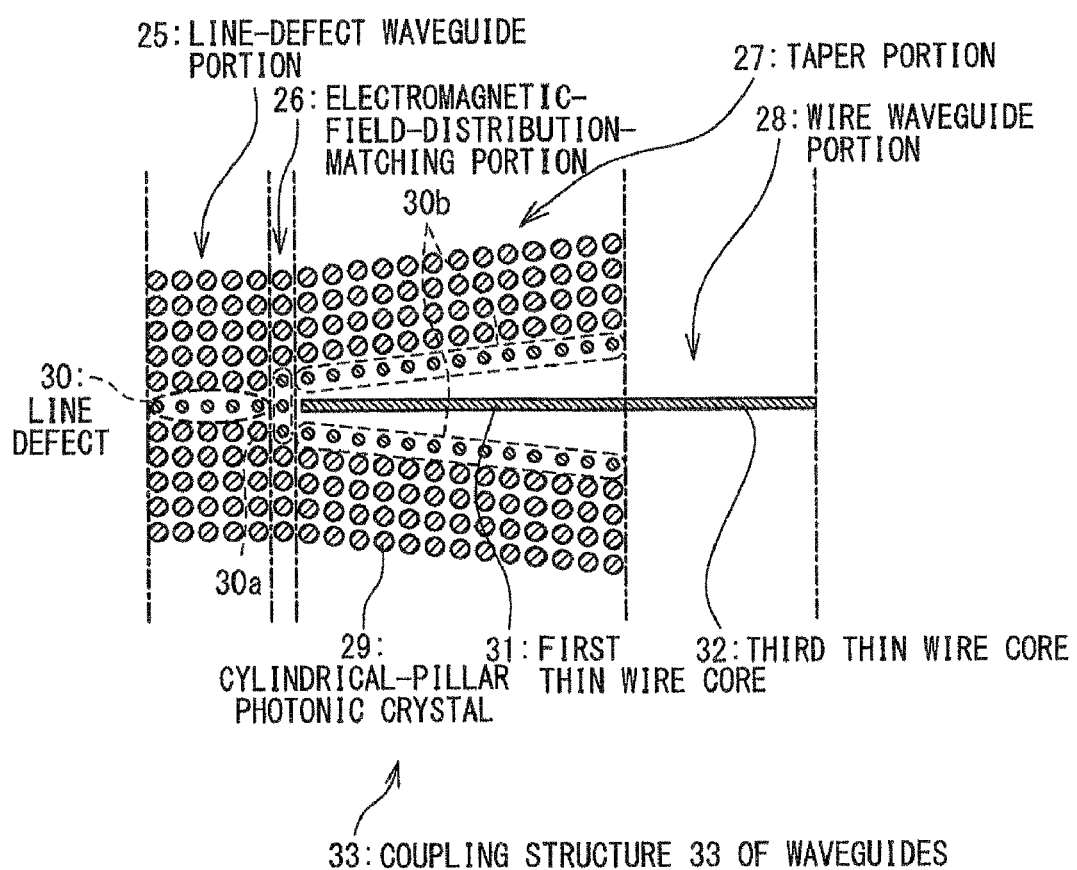
FIG. 4 is a view showing a coupling structure of photonic crystal waveguides according to a second exemplary embodiment of the present invention.

The coupling structure of the waveguides according to the second exemplary embodiment of the present invention will be described below with reference to the drawings. FIG. 4 shows the schematic configuration of the coupling structure of the waveguides according to the second exemplary embodiment of the present invention. A coupling structure 33 of the waveguides according to this exemplary embodiment is the coupling structure 33 of the waveguides to couple: a line-defect waveguide in which light is guided along a line defect of a pillar photonic crystal; and a wire waveguide in which light is guided along a thin wire.

The coupling structure 33 of the waveguides in this exemplary embodiment includes a line-defect waveguide portion 25, an electromagnetic-field-distribution-matching portion 26, a taper portion 27 and a wire waveguide portion 28. The line-defect waveguide portion 25 includes the line-defect waveguide in which a line defect 30 is used as a core. The electromagnetic-field-distribution-matching portion 26 is connected to the line-defect waveguide portion 25. The taper portion 27 is connected to the electromagnetic-field-distribution-matching portion 26. The wire waveguide portion 28 is connected to the taper portion 27 and includes the wire waveguide in which a third thin wire 32 is used as a core. The electromagnetic-field-distribution-matching portion 26 includes a line defect 30a of the pillar photonic crystal. The distribution of the electromagnetic field intensity and the distribution of the electromagnetic impedance of the guided light are converted between the line-defect waveguide portion 25 and the electromagnetic-field-distribution-matching portion 26. The taper portion 27 includes a thin wire core 31 and a line defect 30b of the pillar photonic crystal arranged along at least one side of the thin wire core 31. The energy distributions in the thin wire core 31 of the guided light and the line defect 30b are converted between the electromagnetic-field-distribution-matching portion 26 and the wire waveguide portion 28. Moreover, the energy of the guided light is transferred to any one of the thin wire core 31 and the line defect 30b.

The coupling structure 33 of the waveguides according to this exemplary embodiment includes the structure for further reducing the length in the propagation direction of the light, as compared with that of the first exemplary embodiment. Instead of the first taper portion 11 and the second taper portion 12 in the first exemplary embodiment, this includes the taper portion 27 having the similar function. In the taper portion 27 in this coupling structure, the period in the line direction (the propagation direction of the guided light) of the cylindrical-pillar lattices (30b, 29) on both sides of the thin wire core 31 can be constant, becoming gradually short (not shown), becoming gradually long (not shown) or the combination thereof (not shown). Also, the electromagnetic-field-distribution-matching portion 26 has the length of one period or several periods, which is sufficiently short as compared with the length of the taper portion 27. Thus, the entire length of the coupling structure 33 of the waveguides is shorter than that of the coupling structure including two or more taper portions.

In this exemplary embodiment, as mentioned above, the configuration except the structure of the taper portion 27 is equal to that in the first exemplary embodiment. Thus, only the taper portion will be described below. The taper portion 27 in this exemplary embodiment includes the following structure. The cylindrical-pillars in one line in a cylindrical-pillar photonic crystal 29 are replaced with the thin wire core 31. As for a cross section, the cylindrical-pillar (30b) in one line on each of both sides of the thin wire core 31 differs from the peripheral cylindrical-pillar in diameter. The cylindrical-pillar lattices (30b, 29) on both sides of the thin wire core 31 are gradually away from the thin wire core, as approaching from the side of one end of the thin wire core to the side of the other end. In the coupling structure 19 according to the first exemplary embodiment, in the first taper portion 11, the electromagnetic field of the guided light, which is spread on both sides of the first thin wire core 16, is pushed into the vicinity of the first thin wire core 16. Next, in the second taper portion 12, the electromagnetic field slightly penetrated in the lattices on both sides of the second thin wire core 17 is pulled out and converted into the guided light component of the second thin wire core 17. On the other hand, in the taper portion 27 in this exemplary embodiment, the stage is omitted at which the electromagnetic field of the guided light spreads on both sides of the thin wire core 31 is pushed into the vicinity of the thin wire core 31. Instead, carried out are the operations of pulling out the electromagnetic field distributed in the defect cylindrical-pillar lines (30b) on both sides of the thin wire core 31 and the electromagnetic field slightly penetrated in the peripheral lattices at the same time and converting them into the guided light component of the thin wire core 31. This exemplary embodiment has the effect that the entire length (the length in the propagation direction of the guided light) is smaller, as compared with the conventional taper type coupling structure 8 shown in FIG. 1 and the coupling structure 19 in the first exemplary embodiment, because the taper portion is only in one stage. In the taper portion 27 according to this exemplary embodiment, the stage is omitted at which the electromagnetic field of the guided light spread on both sides of the thin wire core 31 is pushed into the vicinity of the thin wire core 31. However, while this stage is left, the taper portion can be configured in one stage.

Third Exemplary Embodiment

Figure 5:
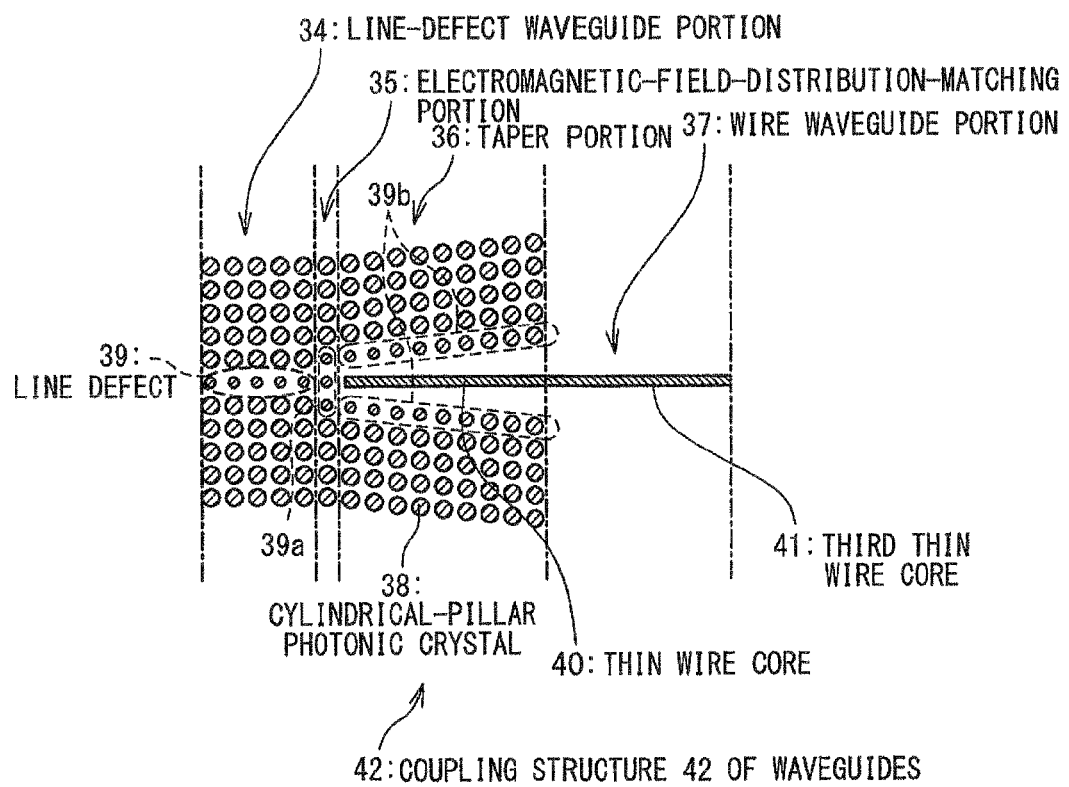
FIG. 5 is a view showing a coupling structure of photonic crystal waveguides according to a third exemplary embodiment of the present invention.

The coupling structure of the waveguides according to the third exemplary embodiment of the present invention will be described below with reference to the drawings. FIG. 5 shows the schematic configuration of the coupling structure of the waveguides according to the third exemplary embodiment of the present invention. A coupling structure 42 of the waveguides according to this exemplary embodiment is the coupling structure 42 of the waveguides to couple: a line-defect waveguide in which light is guided along a line defect of a pillar photonic crystal; and a wire waveguide in which light is guided along a thin wire.

The coupling structure 42 of the waveguides in this exemplary embodiment includes a line-defect waveguide portion 34, an electromagnetic-field-distribution-matching portion 35, a taper portion 36 and a wire waveguide portion 37. The line-defect waveguide portion 34 includes the line-defect waveguide in which a line defect 39 is used as a core. The electromagnetic-field-distribution-matching portion 35 is connected to the line-defect waveguide portion 34. The taper portion 36 is connected to the electromagnetic-field-distribution-matching portion 35. The wire waveguide portion 37 is connected to the taper portion 36 and includes the wire waveguide in which a third thin wire 41 is used as a core. The electromagnetic-field-distribution-matching portion 35 includes a line defect 39a of the pillar photonic crystal. The distribution of the electromagnetic field intensity and the distribution of the electromagnetic impedance of the guided light are converted between the line-defect waveguide portion 34 and the taper portion 36. The taper portion 36 includes a thin wire core 40 and a line defect 39b of the pillar photonic crystal arranged along at least one side of the thin wire core 40. The energy distributions in the thin wire core 40 of the guided light and the line defect 39b are converted between the electromagnetic-field-distribution-matching portion 35 and the wire waveguide portion 37. Moreover, the energy of the guided light is transferred to any one of the thin wire core 31 and the line defect 39b.

The basic configuration of this exemplary embodiment is equal to that according to the second exemplary embodiment except the structure of the taper portion 36. Thus, here, only the structure of the taper portion 36 is described.

In the taper portion 36 in this exemplary embodiment, the cylindrical-pillars in one line in a cylindrical-pillar photonic crystal 38 are replaced with the thin wire core 40. The cross section of the cylindrical-pillars (39b) in one line on each of both sides of the thin wire core, which is located close to the thin wire core 40, is gradually increased from the one smaller than the cross section of the peripheral cylindrical-pillar (38) to the same one, as approaching from the side of one end of the thin wire core to the side of the other end. Simultaneously, the cylindrical-pillars whose cross sections are different and which are located on both sides of the thin wire core 40 and the cylindrical-pillar lattices (39b, 38) including the peripheral cylindrical-pillars thereof are structured to be gradually away from the side of one end of the thin wire core 40 to the side of the other end. In the taper portion 36 in this exemplary embodiment, the operations of pushing the electromagnetic field of the guided light spread on both sides of the thin wire core 40 into the vicinity of the thin wire core 40 and, at the same time, pulling out both of the electromagnetic field distributed in the defect cylindrical-pillar lines (39b) on both sides of the thin wire core 40 and the electromagnetic field slightly penetrated into the peripheral lattices thereof. Then, they are converted into the guided light component of the thin wire core 40.

The taper portion 36 in this exemplary embodiment can be made shorter than the taper portion 27 in the second exemplary embodiment, while the efficiency at which the electromagnetic field of the guided light spread on the side of the electromagnetic-field-distribution-matching portion 35 is converted into the electromagnetic field of the guided light of the wire waveguide portion 37 can be made higher than the taper portion 27 in the second exemplary embodiment and while the wide band and the high transmittance are kept. As a result, this has an effect that it is possible to obtain the further shorter coupling structure of the waveguides.

In the coupling structure of the photonic crystal waveguides described in the first to third exemplary embodiments, the structure of the electromagnetic-field-distribution-matching portion side in the first taper portion or the only one taper portion is the structure which includes the thin wire core and the line defect lines closest to and parallel to the thin wire core on both sides thereof inside the photonic crystal. However, the line defect parallel to the thin wire core may be placed away from the thin wire core, for example, with a distance corresponding to two lattice-constants or more, instead of the nearest neighbor (proximity at a distance of the one lattice-constant). Also, the number of the line defect lines may be two lines or more on each side of the thin wire core.

Fourth Exemplary Embodiment

Figure 6:
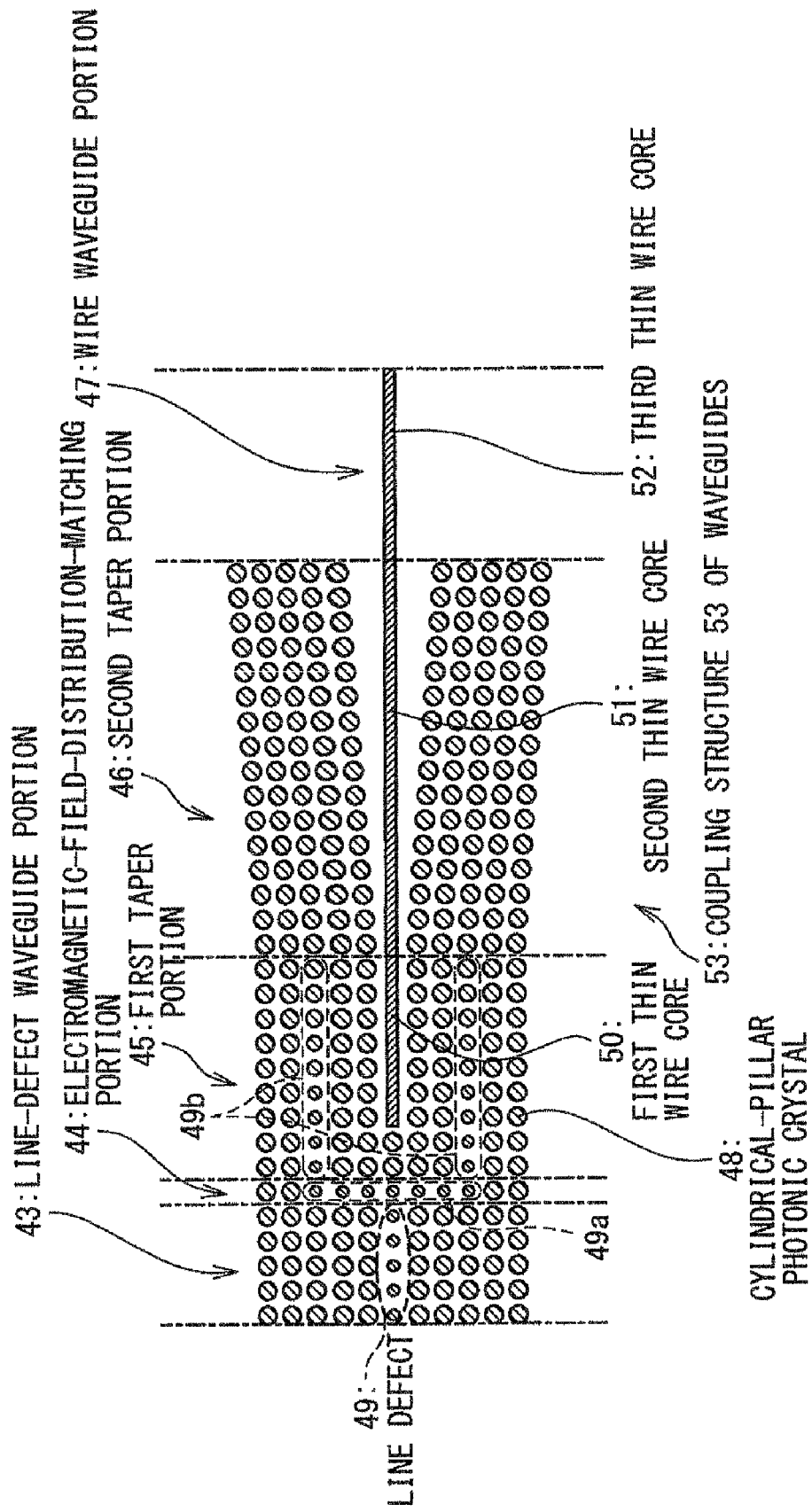
FIG. 6 is a view showing a coupling structure of photonic crystal waveguides according to a fourth exemplary embodiment of the present invention.

The coupling structure of the waveguides according to the fourth exemplary embodiment of the present invention will be described below with reference to the drawings. FIG. 6 shows the schematic configuration of the coupling structure of the waveguides according to the fourth exemplary embodiment of the present invention. A coupling structure 53 of the waveguides of this exemplary embodiment couples: a line-defect waveguide in which light is guided along a line defect of a pillar photonic crystal (48); and a wire waveguide in which light is guided along a thin wire. This coupling structure 53 of the waveguides includes a line-defect waveguide portion 43, an electromagnetic-field-distribution-matching portion 44, a first taper portion 45, a second taper portion 46 and a wire waveguide portion 47. The line-defect waveguide portion 43 includes the line-defect waveguide in which a line defect 49 is used as a core. The electromagnetic-field-distribution-matching portion 44 includes a line defect 49a and is connected to the line-defect waveguide portion 43. The first taper portion 45 includes a line defect 49b and a first thin wire core 50 and is connected to the electromagnetic-field-distribution-matching portion 44. The second taper portion 46 includes a second thin wire core 51 and is connected to the first taper portion 45. The wire waveguide portion 47 is connected to the second taper portion 46 and includes the wire waveguide in which a third thin wire 52 is used as a core.

The basic configuration of the coupling structure 53 of the waveguides according to this exemplary embodiment is equal to that according to the first exemplary embodiment. However, in this exemplary embodiment, the line defects 49b arranged along both sides of the first thin wire 50 of the first taper portion 45 are placed away from the first thin wire 50, with a distance corresponding to the three lattice-constants, respectively.

In this exemplary embodiment, on the side of the electromagnetic-field-distribution-matching portion 44 in the first taper portion 45, light is input from the electromagnetic-field-distribution-matching portion 44 to only the lines of the line defects 49b of the first taper portion 45, and the optical energy is not directly input to the first thin wire core 50. When light propagates to the side of the second taper portion 46 along the lines of the line defects 49b of the first taper portion 45, the optical energy of the light is gradually transferred to the first thin wire core 50. It can be said in other words that the first taper portion 45 is operated as a directional coupler between the photonic-crystal-line-defect-waveguide and the photonic-crystal-thin-wire-core-waveguide. As for the function for transferring the whole of the optical energy from one of two waveguides parallel to each other to the other, the function as the directional coupler of the first taper portion 45 is superior to the function of the conventional directional coupler. In the conventional directional coupler, the whole of the optical energy from one waveguide to the other can be transferred only in the particular frequency (wavelength) in the narrow band. However, in the first taper portion 45 in the fourth exemplary embodiment, the entire optical energy is transferred in the entire waveguide band. This is because the first taper portion 45 is the directional coupler having the taper structure. The line defect of the first taper portion 45 is configured to be removed on the side of the second taper portion 46 due to the taper structure. Thus, the optical energy input along the line defect is transferred to the adjacent first thin wire core 50, because it has nowhere to goon the side of the second taper portion 46.

The electromagnetic-field-distribution-matching portion 44 includes the line defect 49a having a T-branch shape in the waveguide direction of the light, with respect to the line-defect waveguide 49 in the connected line-defect waveguide portion 43. On the side connected to the electromagnetic-field-distribution-matching portion 44 in the first taper portion 45, the light may be input to the lines of the two line defects 49b on both sides of the first thin wire core 50. The operation of the electromagnetic-field-distribution-matching portion 44 is to split the electromagnetic field energy of the light that is guided along the line-defect waveguide 49 in the line-defect waveguide portion 43 and then input it to the lines of the two line defects 49b of the first taper portion 44.

The electromagnetic-field-distribution-matching portion 44 in this exemplary embodiment differs from the electromagnetic-field-distribution-matching portion 10 in the first exemplary embodiment in that the optical energy is not directly distributed to the first thin wire core 50 in the first taper portion 45. In the case of the electromagnetic-field-distribution-matching portion 10 in the first exemplary embodiment, the optical energy is distributed to the first thin wire core 16 simultaneously in addition to the lines of the line defects 15b. The reason is as follows. On the side connected to the electromagnetic-field-distribution-matching portion 10 in the first taper portion 11 in the first exemplary embodiment, since the first thin wire core 16 and the lines of the line defects 15 are adjacent, the electromagnetic fields of the lights propagated along them are strongly coupled with each other. When the lights are guided parallel in such strongly coupled state, unless the electromagnetic field energy is distributed to the first thin wire core 16 and the lines of the line defects 15b such that the optical energy is simultaneously input to the first thin wire core 16 in addition to the lines of the line defects 15b according to the distribution ratio of the electromagnetic field energy naturally determined based on the structure, the reflection of the optical energy occurs. On the other hand, in the case of this exemplary embodiment, the optical energy may be distributed to only the lines of the line defects 49b in the first taper portion 45. In the first taper portion 45 in this exemplary embodiment, since the first thin wire core 50 and the lines of the line defects 49b parallel thereto are separated by the three lattice-constants, each of both can be regarded to be independent. This is because the electromagnetic fields of the three waveguides of the first thin wire core 50 in the first taper portion 45 and the lines of the line defects 49b on both sides are only slightly overlapped with each other. The waveguide in which the line of the line defect 49b in the first taper portion 45 is regarded to be a core has the structure substantially equal to the line-defect waveguide portion 43. Thus, the optical energy is efficiently input through the defect cylindrical-pillar line (49a) of the electromagnetic-field-distribution-matching portion 44 that is similarly regarded to be equal to the line-defect waveguide portion 43. In this way, the optical energy input to the lines of the line defects 49b of the first taper portion 45 is transferred to the waveguide in which only the first thin wire core 50 is regarded to be a core, as propagating to the side of the second taper portion 46.

Fifth Exemplary Embodiment

Figure 7:
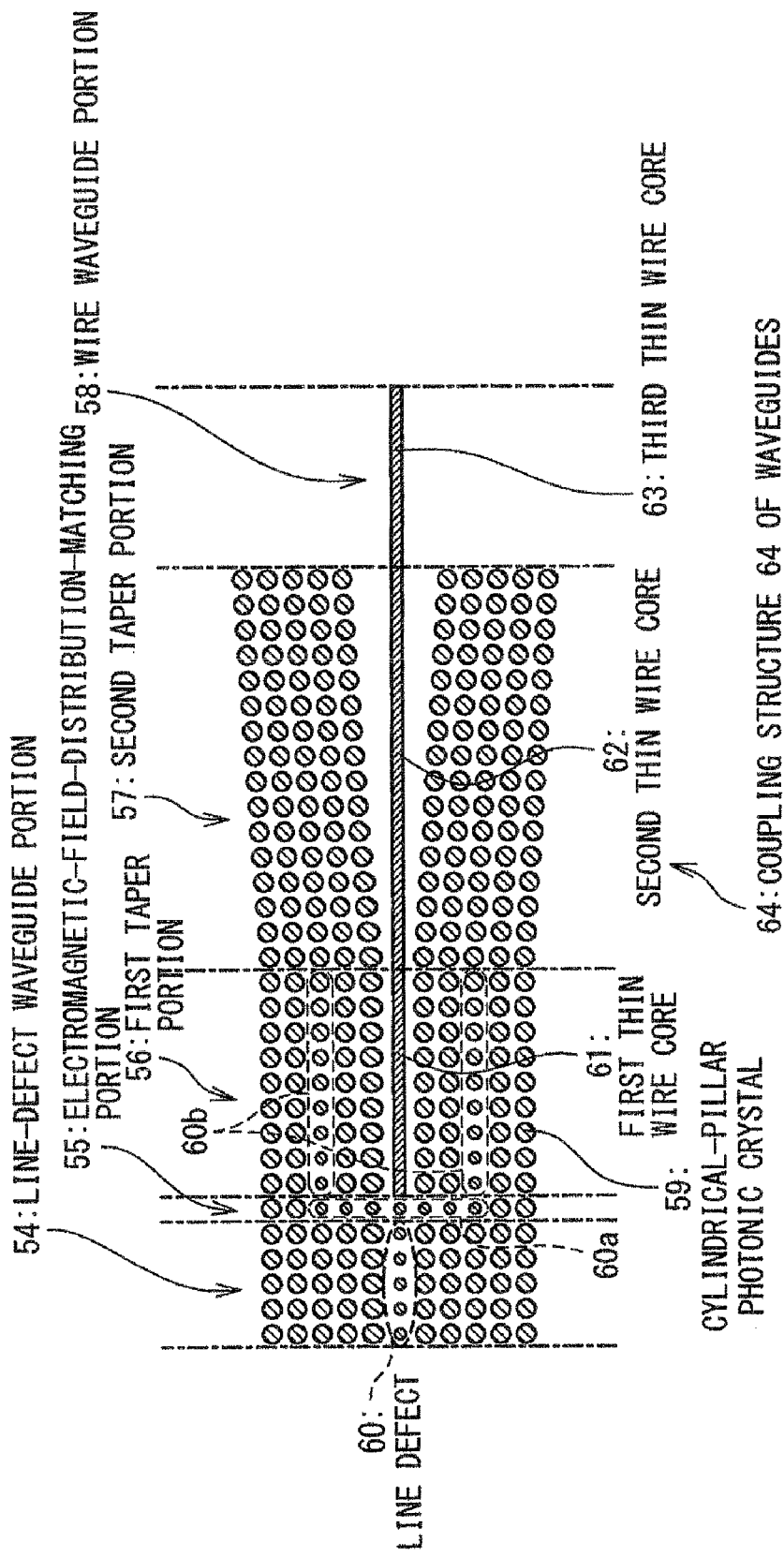
FIG. 7 is a view showing a coupling structure of photonic crystal waveguides according to a fifth exemplary embodiment of the present invention.

The coupling structure of the waveguides according to the fifth exemplary embodiment of the present invention will be described below with reference to the drawings. FIG. 7 shows the schematic configuration of the coupling structure of the waveguides according to the fifth exemplary embodiment of the present invention. A coupling structure 64 of the waveguides of the present invention couples: a line-defect waveguide in which light is guided along a line defect of a pillar photonic crystal (59); and a wire waveguide in which light is guided along a thin wire. The coupling structure 64 of the waveguides includes a line-defect waveguide portion 54, an electromagnetic-field-distribution-matching portion 55, a first taper portion 56, a second taper portion 57 and a wire waveguide portion 58. The line-defect waveguide portion 54 includes the line-defect waveguide in which a line defect 60 is used as a core. The electromagnetic-field-distribution-matching portion 55 includes a line defect 60a and is connected to the line-defect waveguide portion 54. The first taper portion 56 includes a line defect 60b and a first thin wire core 61 and is connected to the electromagnetic-field-distribution-matching portion 55. The second taper portion 57 includes a second thin wire core 62 and is connected to the first taper portion 56. The wire waveguide portion 58 is connected to the second taper portion 57 and includes the wire waveguide in which a third thin wire 63 is used as a core.

The electromagnetic-field-distribution-matching portion 55 in this exemplary embodiment includes the structure for simultaneously distributing a part of the optical energy to the first thin wire core 61 in addition to the lines of the line defects 60b, similarly to the electromagnetic-field-distribution-matching portion 10 in the first exemplary embodiment.

The mechanism of the operation of the coupling structure 64 of the waveguides in this exemplary embodiment is basically equal to the mechanism of the operation of the coupling structure 19 of the waveguides in the first exemplary embodiment. That is, when a part of the light output from the line-defect waveguide portion 54 is input through the electromagnetic-field-distribution-matching portion 55 to the first thin wire core 61 in the first taper portion 56, a part of the optical energy is transmitted into the first thin wire core 61 and a part of the optical energy is reflected because of the mismatching of the electromagnetic impedance. The reflected optical energy is again input through the defect cylindrical-pillar line (60*a*) of the electromagnetic-field-distribution-matching portion 55 to the lines of the line defects 60*b* of the first taper portion 56. The entire optical energy, which is directly input from the line-defect waveguide portion 54 through the lines of the line defects 60*a* of the electromagnetic-field-distribution-matching portion 55 to the lines of the line defects 60*b* of the first taper portion 56, is transmitted into the lines of the line defects 60*b* thereof. As a result, the entire optical energy from the line-defect waveguide portion 54 is input to the first taper portion 56. When the distance between the first thin wire core 61 and the lines of the line defects 60*b* on both sides thereof are set apart as in the first taper portion 45 in the fourth exemplary embodiment and the first taper portion 56 in this exemplary embodiment, there arises the demerit that the length required to perfectly transfer the optical energy, which is input to the lines of the line defects 60*b*, to the first thin wire core 61 turns out to be long in general. However, on the other hand, each of the first thin wire core 61 in the first taper portion 56 and the lines of the line defects 60*b* can be regarded to an independent waveguide, in which it is used as a core. Thus, there is the feature that optimizing the structure of the electromagnetic-field-distribution-matching portion 55 is easy. That is, the cross section of the defect cylindrical-pillar (60*a*) of the electromagnetic-field-distribution-matching portion 55 may be set to be perfectly equal to the cross section of the defect cylindrical-pillars constituting the line-defect waveguide 60 in the line-defect waveguide portion 54. Hence, the fine adjustment of the cross section is not especially required.

Sixth Exemplary Embodiment

Figure 8:
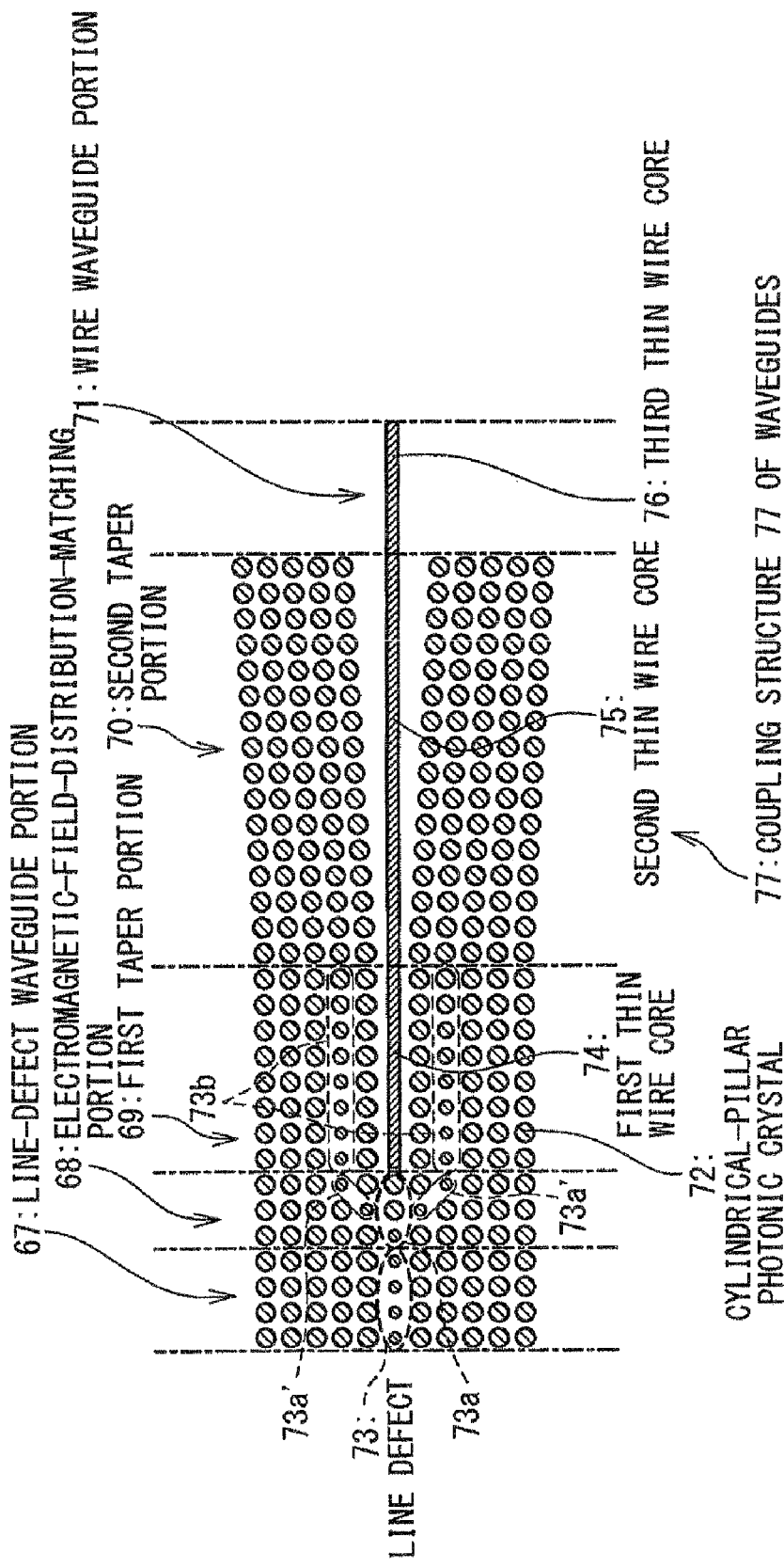
FIG. 8 is a view showing a coupling structure of photonic crystal waveguides according to a sixth exemplary embodiment of the present invention.

The coupling structure of the waveguides according to the sixth exemplary embodiment of the present invention will be described below with reference to the drawings. FIG. 8 shows the schematic configuration of the coupling structure of the waveguides according to the sixth exemplary embodiment of the present invention. A coupling structure 77 of the waveguides of the present invention couples: a line-defect waveguide in which light is guided along a line defect of a pillar photonic crystal (72); and a wire waveguide in which light is guided along a thin wire. This coupling structure 77 of the waveguides includes a line-defect waveguide portion 67, an electromagnetic-field-distribution-matching portion 68, a first taper portion 69, a second taper portion 70 and a wire waveguide portion 71. The line-defect waveguide portion 67 includes the line-defect waveguide in which a line defect 73 is used as a core. The electromagnetic-field-distribution-matching portion 68 includes line defects 73, 73*a*' and is connected to the line-defect waveguide portion 67. The first taper portion 69 includes a line defect 73*b* and a first thin wire core 74 and is connected to the electromagnetic-field-distribution-matching portion 68. The second taper portion 70 includes a second thin wire core 75 and is connected to the first taper portion 69. The wire waveguide portion 71 is connected to the second taper portion 70 and includes the wire waveguide in which a third thin wire 76 is used as a core.

The basic configuration of this exemplary embodiment is similar to that of the fourth exemplary embodiment. However, in the fourth exemplary embodiment, the waveguiding route of the light in the line-defect waveguide portion 43, the electromagnetic-field-distribution-matching portion 44 and the first taper portion 45 is composed of the T-branch of the line-defect waveguide and the two 90° curves (49-49*a*-49*b*). However, in this exemplary embodiment, the waveguiding route of the light in the line-defect waveguide portion 67, the electromagnetic-field-distribution-matching portion 68 and the first taper portion 69 is composed of the line defect having the Y-branch shape in the waveguide direction of the light and the two 45° curves, with regard to the line defect 73 of the connected line-defect waveguide portion 67 (73-73*a* and 73*a*'-73*b*).

According to this exemplary embodiment, the coupling structure 77 of the waveguides, which has the functions similar to the fourth exemplary embodiment, can be attained.

Seventh Exemplary Embodiment

Figure 9:
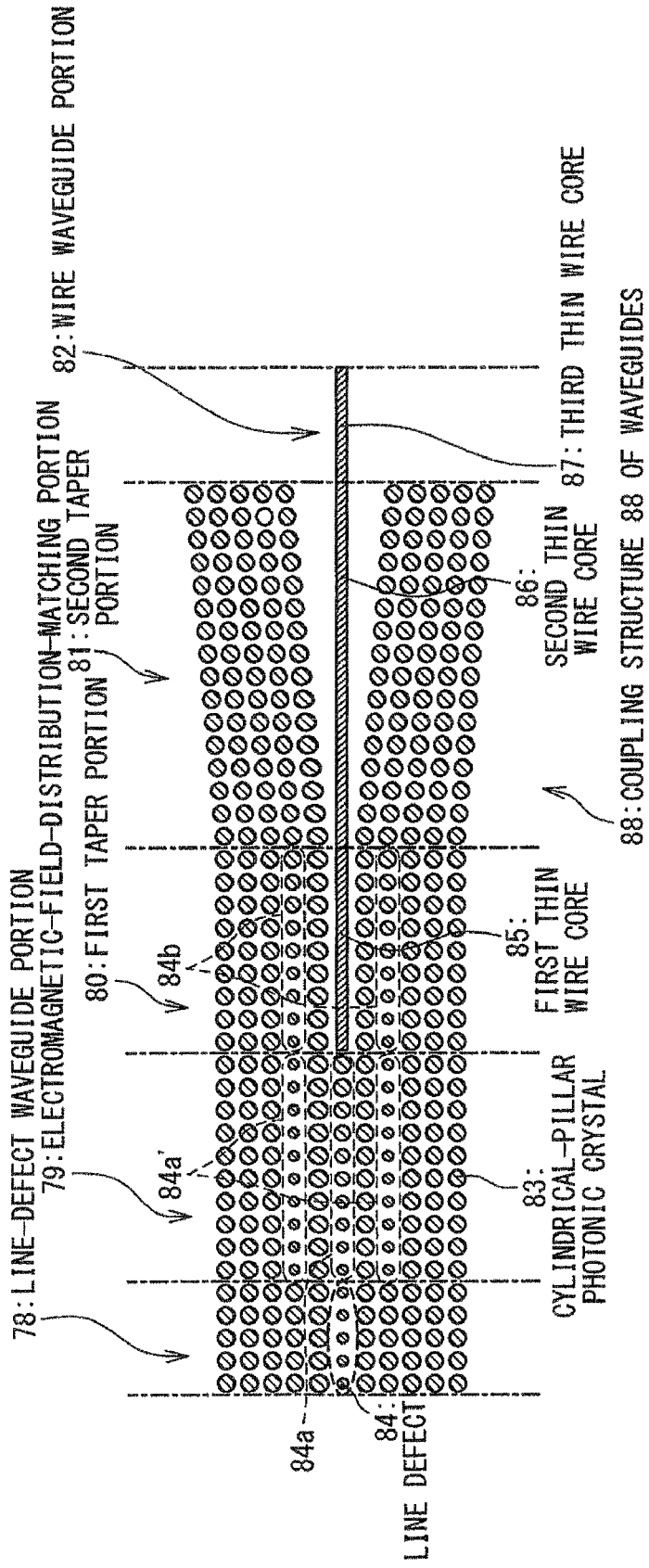
FIG. 9 is a view showing a coupling structure of photonic crystal waveguides according to a seventh exemplary embodiment of the present invention.

The coupling structure of the waveguides according to the seventh exemplary embodiment of the present invention will be described below with reference to the drawings. FIG. 9 shows the schematic configuration of the coupling structure of the waveguides according to the seventh exemplary embodiment of the present invention. A coupling structure 88 of the waveguides of the present invention couples: a line-defect waveguide in which light is guided along a line defect of a pillar photonic crystal (83); and a wire waveguide in which light is guided along a thin wire. This coupling structure 88 of the waveguides includes a line-defect waveguide portion 78, an electromagnetic-field-distribution-matching portion 79, a first taper portion 80, a second taper portion 81 and a wire waveguide portion 82. The line-defect waveguide portion 78 includes the line-defect waveguide in which a line defect 84 is used as a core. The electromagnetic-field-distribution-matching portion 79 includes line defects 84*a*, 84*a*' and is connected to the line-defect waveguide portion 78. The first taper portion 80 includes a line defect 84*b* and a first thin wire core 85 and is connected to the electromagnetic-field-distribution-matching portion 79. The second taper portion 81 includes a second thin wire core 86 and is connected to the first taper portion 80. The wire waveguide portion 82 is connected to the second taper portion 81 and includes the wire waveguide in which a third thin wire 87 is used as a core.

The basic configuration of this exemplary embodiment is similar to that of the sixth exemplary embodiment. Here, the descriptions of the configuration members common to the sixth exemplary embodiment are omitted. However, the electromagnetic-field-distribution-matching portion 79 in this exemplary embodiment differs from the structure of the electromagnetic-field-distribution-matching portion 68 in the sixth exemplary embodiment, in that the taper type directional coupler between the line defect waveguides (84*a*, 84*a*') is used to carry out the electromagnetic-field-distribution-matching between the line-defect waveguide portion 78 and the first taper portion 80.

As described in the respective exemplary embodiments, as for the electromagnetic-field-distribution-matching portion, the various variation structures may be configured. However, the feature common to all of them is to input the entire energy of the guided light of the line-defect waveguide, only to the line defect line of the taper portion connected to the electromagnetic-field-distribution-matching portion, or both of the line defect line and the thin wire core.

Eighth Exemplary Embodiment

Figure 10:
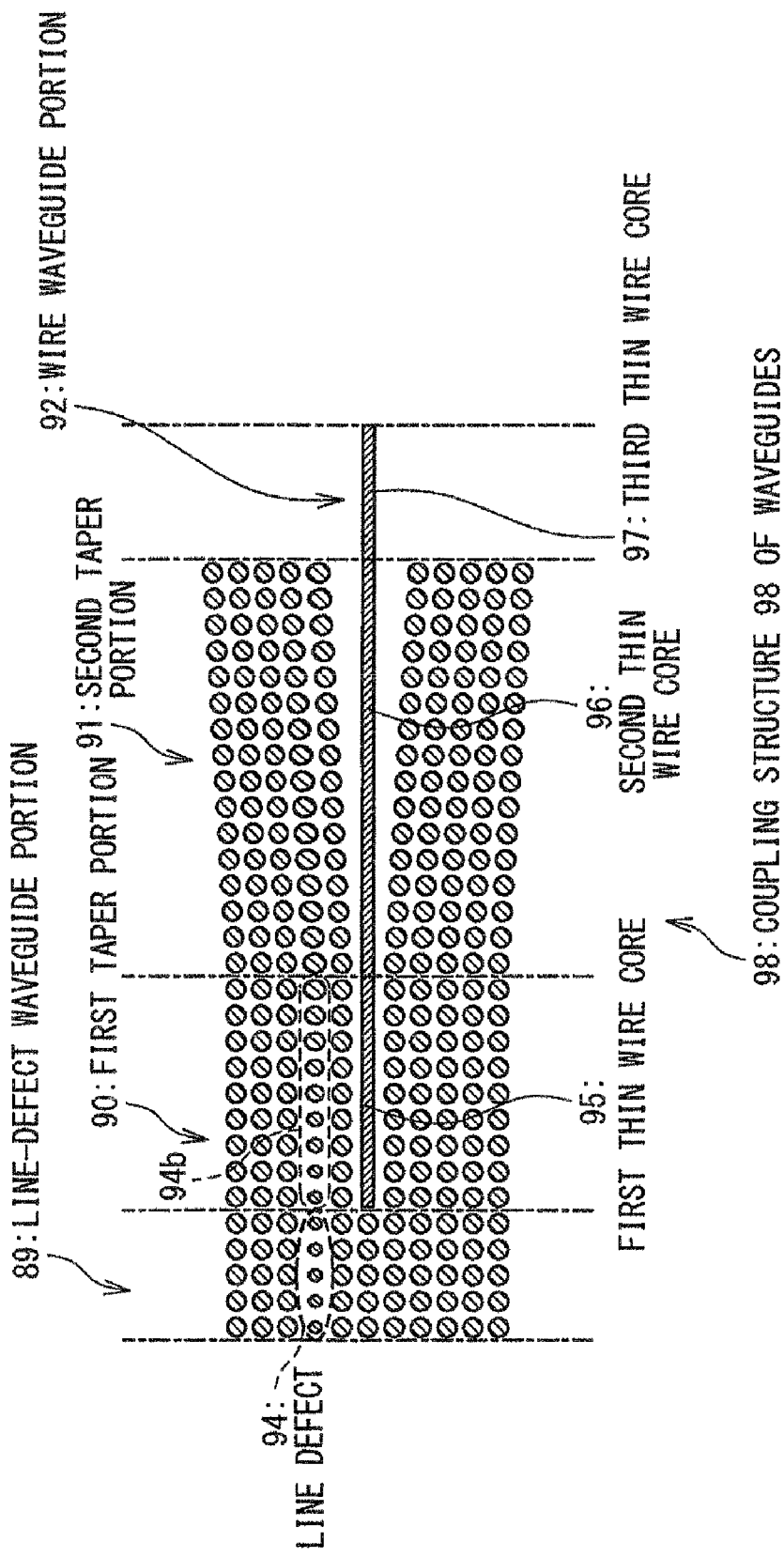
FIG. 10 is a view showing a coupling structure of photonic crystal waveguides according to an eighth exemplary embodiment of the present invention.

The coupling structure of the waveguides according to the eighth exemplary embodiment of the present invention will be described below with reference to the drawings. FIG. 10 shows the schematic configuration of a coupling structure 98 of the waveguides according to the eighth exemplary embodiment of the present invention. In the first to seventh exemplary embodiments, the structure of the side connected to the electromagnetic-field-distribution-matching portion in the first taper portion or the one taper portion is the structure in which the thin wire core and at least one line defect line on both sides thereof exist parallel inside the photonic crystal. However, the line defect line in this exemplary embodiment may exist on only one side without existing on both sides of the thin wire core. In other words, the structure of the electromagnetic-field-distribution-matching portion may be asymmetrical such that the line-defect waveguide in the line-defect waveguide portion and the thin wire core of the first taper portion or taper portion exhibit the positional relation in which their axes are out of each other. Such structure enables the coupling structure of the waveguides to have the configuration in which the electromagnetic-field-distribution-matching portion is omitted. The coupling structure of the waveguides according to this exemplary embodiment does not include the electromagnetic-field-distribution-matching portion.

As shown in FIG. 10, the coupling structure 98 of the waveguides of the present invention couples: a line-defect waveguide in which light is guided along a line defect of a pillar photonic crystal (93); and a wire waveguide in which light is guided along a thin wire. This coupling structure 98 of the waveguides includes a line-defect waveguide portion 89, a first taper portion 90, a second taper portion 91 and a wire waveguide portion 92. The line-defect waveguide portion 89 includes the line-defect waveguide in which a line defect 94 is used as a core. The first taper portion 80 is connected to the line-defect waveguide portion 89. The second taper portion 91 is connected to the first taper portion 90. The wire waveguide portion 92 is connected to the second taper portion 91 and includes the wire waveguide in which a third thin wire 97 is used as a core.

The first taper portion 90 includes a first thin wire core 95 and a first line defect 94b of the pillar photonic crystal that is arranged along at least one side of the first thin wire core 95. The distribution of the electromagnetic field intensity and the distribution of the electromagnetic impedance of the guided light are converted between the line-defect waveguide portion 89 and the second taper portion 91. Moreover, the energy distribution in the first thin wire core 95 of the guided light and the first line defect 94b are converted. The second taper portion 91 includes a second thin wire core 96 and the second line defect of the pillar photonic crystal 93 arranged along at least one side of the second thin wire core 96. The second taper portion 91 transfers the energy of the guided light to any one of the second thin wire core 96 and the cylindrical-pillar photonic crystal 93 between the first taper portion 90 and the wire waveguide portion 92.

Incidentally, in the descriptions of the first to eighth exemplary embodiments, as the typical structure, the pillar constituting the lattice is assumed to be cylindrical. However, the shape of the pillar is not limited to the cylindrical pillar. The pillar of other arbitrary cross-sectional structures such as a quadrangular pillar, a hexagonal pillar or the like may be used. The structure, in which a plural kinds of pillars each having different cross-sectional structures are mixed or in which cross-sectional structures of the pillars are gradually changed, may be used. The size, shape and position of the pillars such as the cylindrical-pillar, the quadrangular pillar and the like may be adjusted slightly from those described above. Also, as the typical lattice, the square lattice is assumed to be a basic structure. However, it is not limited to the square lattice. The other lattices such as the rectangular lattice, the triangular lattice and the like may be used. Also, the structure, in which a plural kinds of lattices are mixed or in which the lattices are gradually changed, may be used. Moreover, in each taper portion, the periods in the propagation direction of the light of the lattices on both sides of the thin wire core may be not only the constant period, but also any one of the period in which it is gradually short, the period in which it is gradually long, and the combination thereof. Also, in each taper portion, the width of the thin wire core may be not only the constant width, but also any one of the width in which it is gradually narrow, the width in which it is gradually wide, the width in which the width is cyclically oscillated, and the combination thereof. Also, similarly, the width of the wire waveguide may be not only the constant width, but also any one of the width in which it is gradually narrow, the width in which it is gradually wide, the width in which the width is cyclically oscillated, and the combination thereof. Also, the number of the lines of the defect cylindrical-pillars on both sides of the thin wire core in each taper portion is not limited to one line, and this may be two lines or more. Also, in the case of the two lines or more, their lines may be adjacent or may be separated by the two lattice-constants or more. Also, the shape of the tip of the thin wire core in the first taper portion or taper portion connected to the electromagnetic-field-distribution-matching portion can be varied such as a rectangle, a pinnacle shape and the like. Moreover, the relative position to the lattice of the tip of the thin wire core may be adjusted. Moreover, as for the high-refractive-index material and the low-refractive-index material that are used in the coupling structure of the waveguides of the present invention, if the respective refractive indexes are equal, different substances may be mixed.

Specific Exemplary Embodiment Based on First Exemplary Embodiment of Present Invention The structure of the first exemplary embodiment and the manufacturing method will be described below by using the specific exemplary embodiment. The photonic crystal optical integrated circuit is expected as the circuit for processing an optical communication signal. To do so, in particular, as the manufacturing method of the first exemplary embodiment, one example of the manufacturing method of the photonic crystal optical integrated circuit used for the light having a wavelength 1.55 μm belonging to a communication waveband will be described below.

At first, one example of the detailed structure of the coupling structure of the waveguides is shown. In the entire coupling structure of the waveguides, the height of the structure made of the high-refractive-index material is 1.28 μm, the refractive index is 3.48, and the refractive index of the background medium is 1.45. The cylindrical-pillar, the thin wire core and the thin wire are made of the high-refractive-index materials. In the structure of the square-lattice-of-cylindrical-pillar photonic crystal line-defect waveguide, the lattice constant is 0.43 μm, the diameter of the cylindrical-pillar is 0.23 μm, and the diameter of the defect cylindrical-pillar is 0.15 μm. The waveguide band of this line-defect waveguide is between the wavelength 1.525 μm and the wavelength 1.603 μm and includes a C-band (1.55 μm band) of a communication waveband. The diameter of each of the three defect cylindrical-pillars located in the electromagnetic-field-distribution-matching portion with the width corresponding to one lattice-constant in length is 0.15 μm equal to that of the defect cylindrical-pillar of the line-defect waveguide. The widths of the first thin wire core in the first taper portion, the second thin wire core in the second taper portion, and the third thin wire core in the thin wire core portion are all 0.1 μm. The diameter of the defect cylindrical-pillars of the lines on both sides of the first thin wire core is 0.15 μm at the side connected to the electromagnetic-field-distribution-matching portion in the first taper portion and 0.23 μm at the side connected to the second taper portion in the first taper portion. The length of the first taper portion corresponds to the twenty lattice-constants, and the increase amount in the diameter of the defect cylindrical-pillars is the constant length for each period. The length of the second taper portion also corresponds to the twenty lattice-constants. The increase amount in the distance between the second thin wire core and the cylindrical-pillar lattice on both sides is the constant distance for each period. The second thin wire core in the second taper portion is continuously connected to the third thin wire core of the thin wire core portion.

The specific example of the manufacturing method will be described below with reference to FIG. 3A to FIG. 3E.

At first, a silicon-on-insulator (SOI) wafer is prepared. This wafer has the structure in which a silicon dioxide film (FIG. 3A: 21) is laminated on a silicon substrate (FIG. 3A: 20) and a high resistance single-crystal silicon film (FIG. 3A: 22) is laminated thereon. The thickness of the silicon dioxide film is 2 μm, and the thickness of the high resistance single-crystal silicon film is 1.28 μm. The refractive index of the silicon is 3.48, and the refractive index of the silicon dioxide is 1.45. Thus, this has the structure shown in FIG. 3A. A resist film for electron beam exposure is coated on this SOI wafer by spin-coating. Next, an electron-beam direct writer is used to draw the pattern of the coupling structure of the waveguides on the resist film and then develop it and consequently generate the resist pattern (FIG. 3B: 23) of the coupling structure of the waveguides. FIG. 3B shows this state. In succession, with the resist pattern as a mask, a dry etcher is used to vertically perform an anisotropic process on the silicon layer. A mixture of sulfur hexafluoride and tetra-carbon octa-fluoride is used as etching gas. FIG. 3C shows this state. After the etching, the resist mask is removed. FIG. 3D shows this state. Finally, the ultraviolet curable resin whose refractive index is 1.45 is coated by spin-coating, and this is cured by emitting the ultraviolet rays. Since the ultraviolet curable resin is liquid at the coating stage, this has a merit that the resin is easily filled between the fine cylindrical-pillar lattices. FIG. 3E shows this state.

In the cases of other exemplary embodiments, the specific manufacturing methods are similar to the above method.

As mentioned above, according to the present invention, this can be used to applications in which the photonic crystal line-defect waveguide and the wire waveguide are optically coupled at the high efficiency in the wide band inside the optical integrated circuit.

According to the present invention, it is possible to provide the coupling structure of the waveguides in which the productivity of the waveguide is improved while the transmission characteristic of the waveguide is kept.

According to the present invention, it is possible to provide the coupling structure of the waveguides that can be miniaturized by the high integration.

It is clear that the present invention is not limited to the above-mentioned exemplary embodiments and that the respective exemplary embodiments can be suitably varied or changed within the scope of the technical idea of the present invention. Also, unless the inconsistency occurs among embodiments each other, the respective techniques in the first to eighth exemplary embodiments can be combined with each other.

The invention claimed is:

1. A coupling structure of waveguides to couple a line-defect waveguide in which light is guided along a line defect of a pillar photonic crystal and a wire waveguide in which light is guided along a thin wire, said coupling structure of the waveguides comprising:
   a line-defect waveguide portion configured to include said line defect waveguide;
   an electromagnetic-field-distribution-matching-portion configured to be connected to said line-defect waveguide portion and a first taper portion;
   the first taper portion configured to be connected to said electromagnetic-field-distribution-matching portion; and
   a wire waveguide portion configured to be connected to said first taper portion and have said wire waveguide,
   wherein said electromagnetic-field-distribution matching-portion includes:
   a matching portion line defect as the line defect of the pillar photonic crystal,
   wherein said matching portion line defect is connected to said line-defect waveguide,
   wherein said first taper portion includes:
   a first thin wire core, and
   a first line defect of the pillar photonic crystal arranged along at least one side of said first thin wire core,
   wherein said at least one of said first thin wire core and said first line defect is connected to said matching portion line defect,
   wherein said wire waveguide is connected to said first thin wire core.

2. The coupling structure of the waveguides according to claim 1, further comprising:
   a second taper portion configured to be connected between said first taper portion and said wire waveguide portion,
   wherein said second taper portion includes:
   a second thin wire core, and the pillar photonic crystal arranged along both sides of said second thin wire core,
   wherein said second thin wire core is connected to said first thin wire core,
   wherein said wire waveguide is connected to said second thin wire.

3. The coupling structure of the waveguides according to claim 1, wherein said pillar photonic crystal is a square-lattice-of-pillar photonic crystal in which pillars made of high-refractive-index materials are arrayed in a shape of a square-lattice inside background medium made of a low-dielectric-constant material.

4. The coupling structure of the waveguides according to claim 1, wherein said line defect of said line-defect waveguide in said line-defect waveguide portion is configured such that a cross section of each of a plurality of pillars that forms at least one line in said pillar photonic crystal is set to a value different from a cross section of a pillar arranged adjacently to said each of the plurality of pillars that forms at least one line.

5. The coupling structure of the waveguides according to claim 4, wherein said line defect of said line-defect waveguide in said line-defect waveguide portion is configured such that a cross section of each of the plurality of pillars that forms at least one line in said pillar photonic crystal is set to a value smaller than a cross section of the pillar arranged adjacently to said each of the plurality of pillars that forms at least one line.

6. The coupling structure of the waveguides according to claim 1, wherein said electromagnetic-field-distribution-matching portion distributes electromagnetic field energy of light, which is guided from said line-defect waveguide in said line-defect waveguide portion, to said first thin wire core in said first taper portion and said first line defect of said pillar photonic crystal arranged along at least one side of said first thin wire core.

7. The coupling structure of the waveguides according to claim 6, wherein said matching portion line defect is arranged to connect said line defect of said line-defect waveguide in said line-defect waveguide portion, and said first thin wire core and said first line defect.

8. The coupling structure of the waveguides according to claim 6, wherein said matching portion line defect is arranged to connect said line defect of said line-defect waveguide in said line-defect waveguide portion and said first line defect.

9. The coupling structure of the waveguides according to claim 8, wherein said matching portion line defect has a T-branch shape with respect to said traveling direction of said guided light.

10. The coupling structure of the waveguides according to claim 8, wherein said matching portion line defect has a Y-branch shape with respect to a traveling direction of said guided light.

11. The coupling structure of the waveguides according to claim 1, wherein a cross section of the each pillar composing said first line defect of said first taper portion is set to be gradually changed from a value smaller than a cross section of said adjacent pillar to a same value, as approaching from a connection end with said electromagnetic-field-distribution-matching portion toward a traveling direction of said guided light.

12. The coupling structure of the waveguides according to claim 1, wherein a width of said first thin wire core in said first taper portion is set such that a ratio of electromagnetic field energy distribution of said guided light, which distribute astraddle on each of said first thin wire core and said first line defect, has an appropriate value.

13. The coupling structure of the waveguides according to claim 1, wherein said pillar photonic crystal in said first taper portion is arranged at a position that is gradually away from said first thin wire core, as approaching from a connection end with said electromagnetic-field-distribution-matching portion toward a connection end with said wire waveguide portion.

14. The coupling structure of the waveguides according to claim 2, wherein said pillar photonic crystal in said second taper portion is arranged at a position that is gradually away from said second thin wire core, as approaching from a connection end with said first taper portion toward a connection end with said wire waveguide portion.

15. The coupling structure of the waveguides according to claim 1, wherein said pillar photonic crystal is a rectangular-lattice-of-pillar photonic crystal in which pillars made of high-refractive-index materials are arrayed in a shape of a rectangular lattice inside a background medium made of a low-dielectric-constant material.

16. The coupling structure of the waveguides according to claim 1, wherein said pillar photonic crystal is a triangular-lattice-of-pillar photonic crystal in which pillars made of high-refractive-index materials are arrayed in a shape of a triangular lattice inside a background medium made of a low-dielectric-constant material.

17. The coupling structure of the waveguides according to claim 3, wherein the pillar configuring said pillar photonic crystal has a cross section shape that is any one of a circle, an ellipse and a polygon.

18. The coupling structure of the waveguides according to claim 1, wherein in a connection portion between said line-defect waveguide portion and said electromagnetic-field-distribution-matching portion, and in a connection portion between said electromagnetic-field-distribution-matching portion and said first taper portion, connections are made such that lattice intervals between said pillar photonic crystals are respectively equal.

19. The coupling structure of the waveguides according to claim 1, wherein in a connection portion between said line-defect waveguide portion and said electromagnetic-field-distribution-matching portion, in a connection portion between said electromagnetic-field-distribution-matching portion and said first taper portion, and in a connection portion between said first taper portion and said second taper portion, connections are made such that lattice intervals between said pillar photonic crystals are respectively equal.

20. A coupling structure of waveguides to couple a line-defect waveguide in which light is guided along a line defect of a pillar photonic crystal and a wire waveguide in which light is guided along a thin wire, said coupling structure of the waveguides comprising:
a line-defect waveguide portion configured to include said line defect waveguide;
a first taper portion configured to be connected to said line-defect waveguide portion;
a second taper portion configured to be connected between said first taper portion and a wire waveguide portion; and
said wire waveguide portion configured to be connected to said second taper portion and include said wire waveguide,
wherein said first taper portion includes:
a first thin wire core, and
a first line defect of the pillar photonic crystal arranged along at least one side of said first thin wire core,
wherein at least one of said first thin wire core and said first line defect is connected to said line-defect wave guide,
wherein said second taper portion includes:
a second thin wire core, and the pillar photonic crystal arranged along both sides of said second thin wire core,
wherein said second thin wire core is connected to said first thin wire core,
wherein said wire waveguide is connected to said second thin wire.

21. The coupling structure of the waveguides according to claim 20, wherein in a connection portion between said line-defect waveguide portion and said first taper portion, and in a connection portion between said first taper portion and said second taper portion, connections are made such that lattice intervals between said pillar photonic crystals are respectively equal.

\* \* \* \* \*